US006185316B1

(12) United States Patent
Buffam

(10) Patent No.: US 6,185,316 B1
(45) Date of Patent: Feb. 6, 2001

(54) SELF-AUTHENTICATION APPARATUS AND METHOD

(75) Inventor: William J. Buffam, West Chester, PA (US)

(73) Assignee: Unisys Corporation, Blue Bell, PA (US)

(*) Notice: Under 35 U.S.C. 154(b), the term of this patent shall be extended for 0 days.

(21) Appl. No.: 08/969,210

(22) Filed: Nov. 12, 1997

(51) Int. Cl.$^7$ .................................................. G06K 9/00
(52) U.S. Cl. ........................ 382/115; 382/125; 382/100; 713/186
(58) Field of Search ................. 178/89; 283/17, 283/73; 382/115, 124, 125, 100, 232; 380/54, 282, 55; 713/186; 340/825.33; 705/50, 71

(56) References Cited

U.S. PATENT DOCUMENTS

| | | | |
|---|---|---|---|
| 2,952,080 | * 9/1960 | Avakian et al. | 380/54 |
| 3,959,771 | 5/1976 | Uno et al. | 340/146.3 H |
| 3,981,443 | 9/1976 | Lynch et al. | 235/156 |
| 3,984,804 | 10/1976 | Lippel, Jr. et al. | 340/5 H |
| 4,253,086 | 2/1981 | Szwarcbier | 340/146.3 E |
| 4,259,661 | 3/1981 | Todd | 340/146.3 AQ |
| 4,322,716 | 3/1982 | Sternberg | 340/146.3 MA |
| 4,414,685 | 11/1983 | Sternberg | 382/49 |
| 4,449,189 | 5/1984 | Feix et al. | 364/513.5 |
| 4,612,666 | 9/1986 | King | 382/32 |
| 4,637,055 | 1/1987 | Taylor | 382/31 |
| 4,644,858 | 2/1987 | Crimmins et al. | 382/48 |
| 4,651,341 | 3/1987 | Nakashima et al. | 382/34 |
| 4,658,428 | 4/1987 | Bedros et al. | 382/30 |
| 4,665,554 | 5/1987 | Sternberg | 382/27 |
| 4,699,149 | 10/1987 | Rice | 128/664 |
| 4,752,957 | 6/1988 | Maeda | 381/42 |
| 4,769,850 | 9/1988 | Itoh et al. | 382/25 |
| 4,795,890 | 1/1989 | Goldman | 235/380 |
| 4,807,287 | 2/1989 | Tucker et al. | 380/23 |
| 4,838,644 | 6/1989 | Ochoa et al. | 350/162.13 |
| 4,905,296 | 2/1990 | Nishihara | 382/42 |

(List continued on next page.)

OTHER PUBLICATIONS

Thomas Cousins, "Investigating A New Identification Technology," Dec., 1995, p. 1–2.

Simon Haykin, "Neural Networks, A Comprehensive Foundation," 1994, p. 363–394.

Primary Examiner—Bhavesh Mehta
(74) Attorney, Agent, or Firm—Rocco L. Adornato; Mark T. Starr

(57) ABSTRACT

An apparatus, method, and computer program for providing authenticating indicia and verifying the image thereby. One particular embodiment is a biometric application such as a fingerprint-based authentication system. The apparatus includes an image receiver for receiving the original image with true image point, a false image point generator providing false image points, and a transient template generator that selectively combines the true image points and the false image points. The apparatus can also constrain false image points to be non-coinciding plausible impostors of the true image points. The apparatus can include a claimant image receiver, a transient template receiver and a comparator for comparing the claimant image points with the template image points and producing an authentication signal. The method can employ a hashing technique to produce an encoding key from the non-coincident plausible impostor false image points, and preselected encryption techniques to produce ciphertext from plaintext with the encoding key. The method can include extracting claimant image points from template image points and iteratively constructing candidate decoding keys from the post-extraction residual points. Authentication is indicated if the decoding key successfully produces a matching plaintext from the ciphertext.

18 Claims, 12 Drawing Sheets

U.S. PATENT DOCUMENTS

| | | | |
|---|---|---|---|
| 4,906,940 | 3/1990 | Greene et al. | 382/16 |
| 5,163,094 | 11/1992 | Prokoski et al. | 382/2 |
| 5,164,992 | 11/1992 | Turk et al. | 382/2 |
| 5,386,103 | 1/1995 | DeBan et al. | 235/379 |
| 5,432,864 | 7/1995 | Lu et al. | 382/118 |
| 5,457,747 | 10/1995 | Drexler et al. | 380/24 |
| 5,469,512 | 11/1995 | Fujita et al. | 382/118 |
| 5,505,494 | 4/1996 | Belluci et al. | 283/75 |
| 5,524,161 | 6/1996 | Omori et al. | 382/125 |
| 5,537,484 | 7/1996 | Kobayashi | 382/124 |
| 5,550,928 | 8/1996 | Lu et al. | 382/116 |
| 5,555,320 | 9/1996 | Irie et al. | 382/225 |
| 5,566,246 | 10/1996 | Rao | 382/154 |
| 5,568,563 | 10/1996 | Tanaka et al. | 382/144 |
| 5,568,568 | 10/1996 | Takizawa et al. | 382/220 |
| 5,570,434 | 10/1996 | Badique | 382/279 |
| 5,574,573 | 11/1996 | Ray et al. | 358/452 |

\* cited by examiner

Figure 12

| | A | B | C | D | E | F | G | H | I | J | K | L | M | N | O | P | Q | R | S |
|---|---|---|---|---|---|---|---|---|---|---|---|---|---|---|---|---|---|---|---|
| 1 | | Brute Force attack (years) on single pentium 200 | 1997 DES crack comparison (see note) (in days) | Average time to extract key (sec) | | | | | | Minutiae missing from sample, present in template | | | | | | High speed MD4 | Decrypt speed (msec) IDEA | TOTAL | |
| | False Minutiae Points | | | 0 | 1 | 2 | 3 | 4 | 5 | 6 | 7 | 8 | 9 | | | (Pentium 200MHz) | | | |
| 2 | 5 | 0.00E+00 | 0.00E+00 | 0 | 0 | 0 | 0 | 0 | 0 | 0 | 0 | 8 | 9 | 10 | 11 | 3.50E-02 | 4.71E-02 | 1.32E-01 | |
| 3 | 6 | 0.00E+00 | 0.00E+00 | 0 | 0 | 0 | 0 | 0 | 0 | 0 | 0 | 0 | 0 | 0 | 1 | 4.19E-02 | 4.71E-02 | 1.39E-01 | |
| 4 | 7 | 0.00E+00 | 0.00E+00 | 0 | 0 | 0 | 0 | 0 | 0 | 0 | 0 | 0 | 1 | 1 | 2 | 4.89E-02 | 4.71E-02 | 1.46E-01 | |
| 5 | 8 | 0.00E+00 | 0.00E+00 | 0 | 0 | 0 | 0 | 0 | 0 | 0 | 1 | 1 | 2 | 3 | 5 | 5.59E-02 | 4.71E-02 | 1.53E-01 | |
| 6 | 9 | 0.00E+00 | 0.00E+00 | 0 | 0 | 0 | 0 | 0 | 0 | 1 | 1 | 2 | 4 | 7 | 12 | 6.29E-02 | 4.71E-02 | 1.60E-01 | |
| 7 | 10 | 0.00E+00 | 0.00E+00 | 0 | 0 | 0 | 0 | 0 | 1 | 1 | 2 | 4 | 8 | 15 | 27 | 6.99E-02 | 4.71E-02 | 1.67E-01 | |
| 8 | 11 | 1.00E+00 | 2.04E-02 | 0 | 0 | 0 | 0 | 0 | 1 | 2 | 3 | 7 | 15 | 31 | 59 | 7.69E-02 | 4.71E-02 | 1.74E-01 | |
| 9 | 12 | 6.00E+00 | 1.23E-01 | 0 | 0 | 0 | 0 | 1 | 1 | 3 | 6 | 13 | 29 | 61 | 123 | 8.39E-02 | 4.71E-02 | 1.81E-01 | |
| 10 | 13 | 3.10E+01 | 6.33E-01 | 0 | 0 | 0 | 0 | 1 | 2 | 5 | 9 | 23 | 53 | 117 | 245 | 9.09E-02 | 4.71E-02 | 1.88E-01 | |
| 11 | 14 | 1.48E+02 | 3.02E+00 | 0 | 0 | 0 | 1 | 1 | 2 | 5 | 15 | 38 | 94 | 215 | 469 | 9.79E-02 | 4.71E-02 | 1.95E-01 | |
| 12 | 15 | 6.64E+02 | 1.36E+01 | 0 | 0 | 0 | 1 | 1 | 3 | 8 | 23 | 62 | 159 | 382 | 869 | 1.05E-01 | 4.71E-02 | 2.02E-01 | |
| 13 | 16 | 2.84E+03 | 5.79E+01 | 0 | 0 | 0 | 1 | 1 | 4 | 11 | 34 | 99 | 264 | 660 | 1561 | 1.12E-01 | 4.71E-02 | 2.09E-01 | |
| 14 | 17 | 1.15E+04 | 2.36E+02 | 0 | 0 | 0 | 1 | 2 | 4 | 16 | 51 | 154 | 427 | 1110 | 2725 | 1.19E-01 | 4.71E-02 | 2.16E-01 | |
| 15 | 18 | 4.50E+04 | 9.20E+02 | 0 | 0 | 0 | 1 | 2 | 6 | 22 | 75 | 234 | 675 | 1822 | 4638 | 1.26E-01 | 4.71E-02 | 2.23E-01 | |
| 16 | 19 | 1.69E+05 | 3.45E+03 | 0 | 0 | 0 | 1 | 2 | 8 | 30 | 107 | 348 | 1045 | 2926 | 7715 | 1.33E-01 | 4.71E-02 | 2.30E-01 | |
| 17 | 20 | 6.08E+05 | 1.24E+04 | 0 | 0 | 0 | 2 | 2 | 10 | 41 | 151 | 511 | 1588 | 4607 | 12563 | 1.40E-01 | 4.71E-02 | 2.37E-01 | |
| 18 | 21 | 2.12E+06 | 4.32E+04 | 0 | 0 | 0 | 2 | 3 | 13 | 55 | 210 | 737 | 2373 | 7120 | 20065 | 1.47E-01 | 4.71E-02 | 2.44E-01 | |
| 19 | 22 | 7.13E+06 | 1.46E+05 | 0 | 0 | 0 | 1 | 3 | 16 | 72 | 289 | 1047 | 3490 | 10820 | 31477 | 1.54E-01 | 4.71E-02 | 2.51E-01 | |
| 20 | 23 | 2.33E+07 | 4.75E+05 | 0 | 0 | 0 | 1 | 4 | 20 | 95 | 392 | 1469 | 5059 | 16190 | 48569 | 1.61E-01 | 4.71E-02 | 2.58E-01 | |
| 21 | 24 | 7.36E+07 | 1.50E+06 | 0 | 0 | 0 | 1 | 4 | 25 | 123 | 525 | 2035 | 7235 | 23876 | 73798 | 1.68E-01 | 4.71E-02 | 2.65E-01 | |
| 22 | 25 | 2.27E+08 | 4.63E+06 | 0 | 0 | 0 | 1 | 5 | 31 | 157 | 697 | 2787 | 10218 | 34741 | 110540 | 1.75E-01 | 4.71E-02 | 2.72E-01 | |
| 23 | 26 | 6.80E+08 | 1.39E+07 | 0 | 0 | 0 | 1 | 5 | 39 | 200 | 915 | 3776 | 14263 | 49921 | 163378 | 1.82E-01 | 4.71E-02 | 2.79E-01 | |
| 24 | 27 | 1.99E+09 | 4.06E+07 | 0 | 0 | 0 | 1 | 6 | 47 | 253 | 1192 | 5064 | 19694 | 70898 | 238477 | 1.89E-01 | 4.71E-02 | 2.86E-01 | |
| 25 | 28 | 5.67E+09 | 1.16E+08 | 0 | 0 | 0 | 1 | 8 | 58 | 317 | 1538 | 6729 | 26917 | 99592 | 344047 | 1.96E-01 | 4.71E-02 | 2.93E-01 | |
| 26 | 29 | 1.58E+10 | 3.23E+08 | 0 | 0 | 0 | 1 | 9 | 70 | 394 | 1970 | 8863 | 36439 | 138466 | 490926 | 2.03E-01 | 4.71E-02 | 3.00E-01 | |
| 27 | 30 | 4.32E+10 | 8.82E+08 | 0 | 0 | 0 | 2 | 11 | 83 | 487 | 2503 | 11578 | 48887 | 190658 | 693303 | 2.10E-01 | 4.71E-02 | 3.07E-01 | |
| 28 | 31 | 1.15E+11 | 2.36E+09 | 0 | 0 | 0 | 2 | 12 | 100 | 598 | 3160 | 15008 | 65034 | 260137 | 969603 | 2.17E-01 | 4.71E-02 | 3.14E-01 | |
| 29 | 32 | 3.02E+11 | 6.17E+09 | 0 | 0 | 0 | 2 | 14 | 118 | 730 | 3961 | 19311 | 85827 | 351891 | 1343583 | 2.24E-01 | 4.71E-02 | 3.21E-01 | |
| 30 | 33 | 7.77E+11 | 1.59E+10 | 0 | 0 | 0 | 2 | 16 | 140 | 886 | 4935 | 24677 | 112415 | 472144 | 1845655 | 2.31E-01 | 4.71E-02 | 3.28E-01 | |
| 31 | 34 | 1.96E+12 | 4.00E+10 | 0 | 0 | 0 | 2 | 19 | 165 | 1070 | 6113 | 31327 | 146192 | 628624 | 2514494 | 2.38E-01 | 4.71E-02 | 3.35E-01 | |
| 32 | 35 | 4.86E+12 | 9.92E+10 | 0 | 0 | 0 | 3 | 22 | 193 | 1285 | 7528 | 39523 | 188832 | 830861 | 3398975 | 2.45E-01 | 4.71E-02 | 3.42E-01 | |
| 33 | 36 | 1.18E+13 | 2.42E+11 | 0 | 0 | 0 | 3 | 25 | 225 | 1537 | 9222 | 49571 | 242345 | 1E+06 | 4560497 | 2.52E-01 | 4.71E-02 | 3.49E-01 | |
| 34 | | | | 0 | 0 | 0 | 3 | 28 | 261 | 1830 | 11241 | 61825 | 309127 | 1E+06 | 6075754 | | | | |

SELF-AUTHENTICATION APPARATUS AND METHOD

FIELD OF THE INVENTION

The invention herein relates to a verification system and, in particular, to an apparatus and method for providing self-authentication of an image, and a computer program therefor.

BACKGROUND OF THE INVENTION

As the trend toward computer networking continues, the ability to verify the identity of system users with a high degree of accuracy becomes more important. Adequately secure systems deter, prevent, or detect unauthorized disclosure, modification, or use of information. Systems which cannot differentiate between requests for service by legitimate users and unauthorized access attempts are vulnerable to a variety of attacks.

In the past, it was relatively easy to protect computer systems because they were typically installed in a centralized computing facility. Because the terminals used to access the computer usually were in the same building, only those persons having physical access to the building would be able to use the terminals. However, as networked IT systems proliferate, this level of physical access control becoming much less feasible. The design of open computing systems permits access to more systems, thereby allowing access to legitimate users and intruders, alike.

Among the popular methods used by IT system intruders are:

Password cracking

Exploiting known security weaknesses

Network spoofing

"Social engineering"

Masquerade

Replay

Repudiation

Interception of data

Manipulation of messages

One of the most common techniques used to gain unauthorized system access involves password cracking and the exploitation of known security weaknesses. Password cracking is a technique used to surreptitiously gain system access by using another user's account, often because the other user selected a weak password, for example, one easily guessed, based on knowledge of the user (e.g. wife's maiden name) a password that is susceptible to dictionary attacks (i.e., a brute-force guessing of passwords using a dictionary as the source of guesses). Unauthorized system access can be gained through the exploitation of known security weaknesses, such as system configuration errors, and security bugs.

In network spoofing, a system presents itself to the network as though it were a different system, for example, by presenting the other system's address as its own. In "social engineering," an intruder may call a system operator, pretending to be some authority figure, and demand that a password be changed to allow them access.

Masquerade refers to users representing themselves as other users. Replay of data can be accomplished by recording the authentication data and playing it back at the whim of the intruder. If a user denies sending (or receiving) a communication, the communication has been repudiated. Passive eavesdropping on communications is a simple, but effective, form of data interception. Messages can be manipulated through unauthorized insertions, deletions, or modifications to messages. Clearly, some techniques, when implemented, can be indistinguishable from others, but the effect of these methods is undeniable—compromised computer security.

Users may be able to access network-connected computers from any physical location on the network, indeed from anywhere around the world, and the logical connection which supports a session between the user and a given computer may travel through many communications circuits, each subject to intrusion by the above methods. The increasing level of interconnection between computer systems has made it possible to distribute and process information far more easily than in the past. However, it has also become significantly more difficult to identify system users based on physical location, because the pathway between a user and the computing resources accessed by that user may be impossible to trace. One key process in determining the identity of a user, or claimant, is that of authentication.

Authentication is the verification of the true identity of a user. It is of such fundamental importance in IT systems that the DoD Computer Security Center standard, "Department of Defense Trusted Computer System Evaluation Criteria" (CSC-STD-001-83, August 1983) states: "Without authentication, user identification has no credibility. Without a credible identity (no) security policies can be properly invoked because there is no assurance that proper authorizations can be made." Authentication, then, is essential to the proper use of IT systems handling sensitive data.

The three generally-accepted categories of methods for authenticating a user's identity are based on: (1) something the user knows, such as a password; (2) something the user possesses, such as an authentication token; or (3) some physical characteristic of the user, such as a fingerprint or voice pattern. Collectively, these are called credentials. Authentication systems can be hardware, software, or procedural mechanisms that enable a user to obtain access to computing resources. At the simplest level, the system administrator who adds new user accounts to the system is part of the system authentication mechanism. More sophisticated solutions can use fingerprint readers or retinal scanners to establish a potential user's identity. Without establishing and proving a user's identity prior to establishing a session, an IT system is vulnerable to any sort of attack.

Traditionally, users have been individually supplied with a secret password, which they must submit when requesting access to a particular system. The majority of computer systems in use today rely solely on passwords for authentication. The primary advantage of password-only authentication is that it can be implemented entirely in software, thus avoiding the cost of special purpose authentication hardware. However, password-only systems have a number of disadvantages in practice which restrict their use to applications with minimal security requirements, or situations where password management can be strictly controlled. Suitable secret information often cannot easily be remembered by a human. It may consist, for example, of from 56 to 1024 bits, or an even longer length, of randomly generated material.

A password is a sequence of characters obtained by a selection or generation process from a set of acceptable passwords. A good password system has a very large set of acceptable passwords in order to prevent an unauthorized person (or intruder) from determining a valid password in some way other than learning it from an authorized person (i.e., owner). The set of acceptable passwords should be large enough to assure protection against searching and testing threats to the password, commensurate with the value of the data or resources that are being protected. The set of acceptable passwords must be such that it can be specified easily, that acceptable passwords can be generated or selected easily, that a valid password can be remembered, can be stored reasonably, and can be entered easily.

Broadly stated, the security provided by a password depends on its composition, its length, and its protection from disclosure and substitution during storage and transmission. Composition is defined as the set of characters which may comprise a valid password. The composition of a password depends in part on the device from which the password is going to be entered.

Length is closely associated with composition in assessing the potential security of a password system against an intruder willing to try exhaustively all possible passwords. The length of a password provides bounds on the potential security of a system. The potential number of valid passwords is proportional to the number of characters in the acceptable composition set, raised to the power of the length of the password. The potential number of passwords in a credentialing scheme with a composition of 10 digits and a length of exactly 4 provides for $10^4$ or 10,000 possible passwords, ignoring any other limiting factors.

Increasing these parameters would be expected to have a positive effect on the overall security of the system because exhaustive attacks become more difficult. Other factors, though, cannot be ignored in practical password systems. For example, entering a password into an automated authentication system in a secure manner can be a difficult task. An interested observer can detect part or all of a password while the user is entering the password. Computer keyboards are the typical entry device, and are not particularly suited for password entry. A user that is not a trained typist often enters the password slowly, with one finger, allowing a greater degree of observation. Long, random passwords can be more difficult to remember, be entered more slowly and visibly, and may be more subject to error when being entered. Paradoxically, a long, random password thus may be more vulnerable to observation than a short, easily-entered password.

Whether passwords are distributed electronically, in hardcopy form, or through other means, the distribution process also is subject to attack or subversion, and be impotent against disclosure. Sealed envelopes with tamper-evident features can be used for distribution of hardcopy passwords. If an unauthorized party intercepts a tamper-evident envelope and opens it to read the password, the envelope cannot be resealed and sent to the intended recipient without evidence of tampering. This approach relies on the system users to recognize and report suspected disclosure of hardcopy passwords. If a password is compromised in this fashion, there may be a short period of time before the legitimate user detects and reports the compromise.

The effectiveness of passwords often is questioned, primarily because they can be easily forgotten, lost, or given to another person. A user who allows his account to be compromised increases the chances of compromising other accounts or resources. In some circumstances, passwords are shared as "community" passwords among members of an organization because maintaining password integrity is considered as a nuisance that is ineffective and subservient to the organization's primary mission (e.g., health care, banking, law enforcement). Despite the heightened awareness of the need for tighter controls on access to computer systems, it is not unusual for one to find a password written on note paper and taped to a heavily-used monitor in public view.

In these situations, the composition, length, and manner of distribution of the passwords are meaningless. However, passwords can provide reasonable deterrence to unauthorized access if properly handled by people authorized to use them and if properly stored and processed in the password verification system. Token-based credentials can be as susceptible to attack as password systems: tokens (e.g., ID cards) can be lost, stolen, or counterfeited. The bearer of a compromised token can be just as indistinguishable to an IT system as the bearer of a pilfered password.

Authentication systems are useful in commercial and government environments in a myriad of applications. The strength of an authentication system should be chosen to provide a degree of assurance appropriate for the security requirements of the application and environment in which the system is to be used and the security services provided by the system. The central design objective of an authentication system is to protect against adversaries mounting cost-effective attacks on sensitive data, that is, an effective security system design makes the cost of an attempted attack greater than the expected payoff.

As used herein, the concept of identity verification is described primarily with respect to human users but could be applied to other types of users as warranted by the application and with suitable modifications known to skilled artisans.

Reliable authentication mechanisms are critical to the security of any automated information system. If the identity of legitimate users can be verified with an acceptable degree of accuracy, those attempting to gain access without proper authorization can be denied permission to use the system. When a legitimate user's identity is verified, access control techniques are applied to mediate that user's access to system resources. If a computer system cannot verify the identity of users and other computers, the system will not be able to protect itself against unauthorized access.

Networking not only makes it more difficult to identify system users, it also increases the opportunities for unauthorized parties to intercept authentication data passing through the network during the course of a legitimate session between a user and a remote host computer. User passwords are sometimes transmitted through a network in plaintext form. If an attacker is able to monitor the user's session, the attacker may be able to record the user's password or other critical authentication data. This would allow the attacker to masquerade as a valid user by initiating a login on the remote host and submitting the user's authentication data when the host requests it.

Some systems apply a cryptographic algorithm to scramble (encrypt) passwords before they are transmitted, so that the plaintext password is not exposed. However, an attacker may still be able to record the encrypted password, and gain access to the host computer by submitting the encrypted value. In either case, the host computer will be unable to distinguish between the attacker and a valid user, and will grant access to the attacker. This "replay" attack can be defeated by using a random challenge/response mechanism in which a variable parameter (typically time-varying) is integrated into the encrypted password and an attempted replay of the "stale" password reveals the attacker, thus permitting the system to preserve its integrity. Obviously, the security of a replay-prevention technique hinges on the generation of random challenges which have a low probability of being repeated.

Furthermore, an IT system typically stores passwords for use in the authentication process. When a user attempts to login to the system, the user will submit a password which must be compared to the stored password, or some one-way mapping thereof, which the system knows to be valid for that user. Protection can be provided for passwords by storing them in a physically separate area which can only be accessed by authorized system components. Stored passwords may also be protected by encryption or through the application of a one-way mapping function before storage.

The aforementioned shortcomings of existing authentication schemes are magnified when human users are required to access multiple services on multiple hosts. Separate authentication events may be required for each service a user wishes to access, particularly if these services are resident on separate host machines. Users might, for example, be required to provide a separate password for each service. In some cases, services or host computers may even use different authentication techniques which would, for example, force users to memorize passwords for some services and carry tokens or provide biometric scans for others. This situation quickly becomes an unreasonable burden for users, and can lead to, or exacerbate, poor security practices.

To address the problems described above, login authentication schemes have been developed that only require users to authenticate once during a session. These approaches are commonly referred to as unitary login, or single sign-on. Unitary login is generally a two-step process, in which the user first authenticates to a user using, for example, a password, token, or biometric sample. The principal may be the user's workstation, a physical authentication token, or some other device. Then, as the user requests access to various services, the principal is responsible for authenticating the user to each service.

Conceptually, the principal acts as a proxy for the user in conveying the original authentication event, and automates subsequent authentications with little or no intervention from the user. These subsequent authentications are usually based on strong cryptographic protocols which are secure across communications networks. Both the principal and the verifying entity of the service accessed by the user must understand, and adhere to, the pre-arranged authentication protocol. Also, it is preferred that the principal be responsible for determining the point at which a given user's current authentication terminates. This termination point is often tied to the end of a user's login session.

Authentication based on public key cryptography may have an advantage over other authentication schemes because no secret information has to be shared by the entities involved in the exchange. A user presenting for authentication can use a private key to digitally sign a random number challenge issued by the verifying entity. This random number is desired to be a time-variant parameter which is unique to the authentication exchange. If the verifier can successfully verify the signed response using the user's public key, then the user has been successfully authenticated.

The foregoing interactive exchange is sometimes referred to as a "zero-knowledge proof" in which knowledge of the private is proved without divulging the actual key. That is, the prover convinces the verifier of a statement (with high probability) without revealing any information about how to go about proving that statement.

Because a given user's private key does not need to be shared with other parties, there is a strong association between the user's identity and possession of the private key. Digital signatures can be used for authentication as follows: when a host system wishes to verify the identity of a user who is in possession of a particular private key, the host system can challenge the user with an electronic message. The user would sign this message with the private key and return the signature to the host system. The host can then verify the signature, and thus the identity of the user, with the user's public key. Because only one specific user possesses a particular private key, a signature generated by this key is strong proof of the user's identity.

These cryptographic methods are referred to as "asymmetric" or "two-key" methods, because they rely on two different keys to perform cryptographic processing of data. The requisite keys are generated and used in pairs consisting of private and public key components. Because there is no longer a single secret key shared by a pair of users, and each user has his own key material, public-key techniques differ from conventional systems. Furthermore, the key material of each user is divided into two portions, a private component and a public component. The public component generates a public transformation E, and the private component generates a private transformation D.

The public key becomes in effect part of the user's identity, and should be made as well known as necessary, like a phone number. Conversely, the private key should be known only to the user, because it can be used to prove ownership of the public key and thus the user's identity. A desirable property of public key systems is that it essentially computationally infeasible to derive a user's private key from the corresponding public key, so free distribution of the public key theoretically poses no threat to the secrecy of the private key. The private key can be used to create a digital signature which is unique to the signer, which signature is infeasible to forge and can be verified electronically.

Also, public key cryptography makes it possible to place the authentication information under the direct control of the system user. For access control, this is especially helpful because secret authentication information need not be distributed throughout the system.

However, the security of authentication protocols based on secret- or public-key cryptography is dependent on the level of protection provided for the private keys and, for public-key cryptography, the degree to which a verifier trusts the source of the public keys. Authentication using secret-key systems requires sharing of some secret data, with the attendant risk of discovery and misuse of the secret information. Also, a trusted third party may need to act as an intermediary in secret key systems, risking message repudiation or, in some instances, widespread forgery due to an attack on the third party's central database. In the latter case, the cost for refreshing all compromised keys to an organization could be staggering. Where trusted third parties are needed to certify the validity of a principal's public key, the risk of compromise of the trusted third party's private key is much reduced, but not eliminated, as compared with an attack on a secret-key database.

In the event an intruder, having knowledge of the encryption algorithms used, gains access to the encrypted private keys, the integrity of those private keys based on immutable properties may be forever lost. This can be a risk for both secret- and public-key approaches.

Furthermore, where a certifying authority is interposed between the communicating parties in a public-key system, a successful attack on the authority by an adversary will allow the adversary to impersonate whomever the adversary chooses by using one of the compromised authority's public key certificates to bind a key of the adversary's choice to the name of another user. As before, it is critically important to an authentication system to permit rapid, widespread key refreshment if compromised keys are discovered.

Two authentication schemes use fingerprint-related data, or minutiae, to verify successful key recovery. For example, Veridicom, Inc. of Santa Clara, Calif., has described a solution that uses an algorithm based on graph theory to verify successful key recovery. Because this solution derives the key from true minutiae, rather than false minutiae, key refresh in the event of compromise is problematic, regardless of the encryption technique employed. Barring the use of a compromised fingerprint can potentially bar the compromised user from ever again gaining access to the system.

In another example, U.S. Pat. No. 5,541,994, Fingerprint Controlled Public Key Cryptographic System (Tomko, et al.), the system generates a cryptographic key from an analog, optical transform of a fingerprint, as opposed to a reduction to digital minutiae. In addition to the complexities imposed by the analog implementation, the system creates the key from the actual biological sample. As before, key refresh in the event of key compromise poses a particularly vexing challenge, given that the compromised user is saddled with forever bearing the basis for the compromised key—his fingerprint. This patent is herein incorporated by reference in its entirety.

In U.S. Pat. No. 5,621,515, Identification System Using Regions Of Predetermined Properties Interspersed Among Regions Of Other Properties (Hoshino, et al.), a system attempts to obfuscate authentication data by combining effective and ineffective identification regions which are hardly distinguishable by naked eyes. This system relies upon a predetermined pattern of diffracted light being reflected by the identification regions. These regions are permanently affixed to an authentic article. The system is defeated, however, in the event a forger gains access to a "genuine optical reader/writer," in which case the effective and ineffective identification regions are revealed. Because the identification regions are affixed to the article, the obfuscating pattern can not be altered or updated without damaging the article. This patent is herein incorporated by reference in its entirety.

What is needed, then, is an apparatus, method, and computer program to provide an enhanced level of security to IT systems by providing users or claimants with a secure, unique, easy-to-use credential that is passively in their possession, and not susceptible to omission, subversion, loss or theft. Furthermore, where immutable characteristics such as fingerprints and fingerprint minutiae are used to authenticate a system user, it is desirable to obviate the difficulties that may arise in the event the user's fingerprint is compromised. In such cases, it is particularly desirable to provide a refreshed encryption key, which may be quite difficult if the key is based on immutable features. In general, there is a need for an apparatus, method, and computer program that provides an enhanced degree of self-authentication for an entity.

SUMMARY OF THE INVENTION

The invention disclosed herein includes an apparatus, method, and computer program for self-authentication of an image. The image is associated with "true image points." The apparatus can include an image receiver for receiving the original image; a false image point generator providing false image points; and a transient template generator connected with the image receiver and false image point generator to provide a transient template by selectively combining the false image points and a preselected portion of the true image points. It is preferred that the false image point generator constrains false image points such that the false image points are plausible impostors of the true image points and the false image points are not coincident with the true image points. In a preferred embodiment the apparatus can include a key generator interposed between the false image point generator and the transient template generator for creating a substantially random encoding key from the false information points using a preselected key generation technique, for example, hashing. A master template can be obtained from the original image, and stored in a master template database, for later analysis and comparison. The apparatus also can include an encoder operably connected with the key generator and the transient template generator to produce ciphertext from plaintext input to the encoder, responsive to the encoding key.

In an embodiment of the invention, it is preferred to include a claimant image receiver for receiving a claimant image purporting to be the original image, with the claimant image having claimant true image points unique to the claimant image; and a transient template receiver accepting a transient template having information points unique to the original image. The information points have a preselected portion of original true image points selectively combined with false image points. It is also preferred that the template receiver differentiate the true information points and the false image points. Furthermore, this embodiment is preferred to have a comparator connected with the transient template receiver and the claimant image receiver. Here, the comparator compares the claimant true image points with the preselected portion of the original image points and produces an authentication signal responsive to the prior comparison.

It is also preferred that the transient template includes corresponding plaintext and ciphertext. In this embodiment the comparator can include a decoder that removes the claimant true image points from the information points and produces proffered false image points. The decoder also can extract a decoding key from the proffered false image points using the key to decode the ciphertext therewith and produced proffered plaintext. The comparator then receives original plaintext and compares it to the proffered plaintext with an authentication signal be produced in response to the comparison.

The invention also includes a method for providing authenticating indicia in an original image having associated information points. The method includes the steps of selecting true image points from the information points; providing false image points; and forming a transient template by selectively interposing the false image points within the preselected true image points. Here, the true image points are representative of the original image, and the false image points are essentially concealed among the preselected true image points, thereby creating a transient template with the authenticating indicia. It is most preferred that the false image points are plausible impostors of the true image points.

The method also can include the steps of generating an encoding key using a preselected key generating technique; encrypting plaintext into ciphertext with the encoding key using a preselected encryption technique; and adding the ciphertext to the transient template. The preselected key generating technique can be, for example, a hash technique, and the preselected encryption technique can include a symmetric encryption technique, or an asymmetric encryption technique with a private key having an arbitrary value. This method also can include creating from the true information points a master template that is a unique representation of the original image. The master template then can be stored for later use.

In one particular embodiment of the invention herein, the image is a biometric image, namely, a fingerprint, the true information points are fingerprint minutiae, the preselected key generating technique includes a hashing technique, the preselected encoding technique can includes a symmetric encryption technique or an asymmetric encryption technique with a private key of arbitrary value.

Furthermore the method can include the steps of receiving a proffered image including a transient template having the authenticating indicia; receiving a claimant image having claimant true image points; comparing the authenticating indicia in the proffered image to the true image points in the claimant image; and providing a perceptible indication of authentication responsive to the comparison. It is preferred that the authenticating indicia include template true image points and false image points. Here, the template true image points correspond to chosen image points derived from true image points that are unique to an original image using a predetermined selection technique. It is most preferred that the false image points are selectively interposed and substantially concealed among the template true image points. The method can further include the steps of extracting the false image points from the template true image points; generating a decoding key with the false image points using a preselected decoding technique; decoding the ciphertext using the decoding key to produce a proffered plaintext; comparing the proffered plaintext with the known plaintext; and providing a perceptible authentication signal responsive to the comparison. In this case, the authenticating indicia can have ciphertext derived from known plaintext, and added to the transient template.

In another present embodiment of the invention it is preferred to provide a method for self-authentication of a user, which uses the steps of enrolling the user by sensing original true image points unique to the user; selecting template true image points from a portion of the original true image points using a predetermined selection technique; generating false image points; and selectively interposing the false image points among the template true image points such that the false image points are essentially hidden, thus creating a transient template.

In this embodiment, it also is preferred that the step of generating false image points includes selecting false image points that do not coincide with original true image points; and conditioning the false image points to be plausible impostors of the original true image points or the template true image points. False image point generation can create an encoding key from the false image points using a preselected key generation technique, for example, a one-way technique, such as a hashing technique. Furthermore, this method can include encrypting plaintext with the encoding key to produce ciphertext using a preselected pseudorandom technique and then appending the plaintext and the ciphertext to the transient template.

In the embodiment thus described, the method can be complimented by adding the steps of receiving a transient template having the template true image points, false image points, and ciphertext; receiving a user image having user true image points; extracting user true image points from corresponding template true image points, thereby isolating candidate false image points; generating a candidate decoding key from the candidate false image points; decoding the ciphertext using the candidate decoding key, creating a plaintext candidate; comparing the plaintext candidate with the plaintext; and providing a perceptible indication of authentication responsive to the comparison.

In yet another embodiment of the invention, the method can include receiving a transient template having template true image points, false image points, and ciphertext, with the template true image points being unique to an authorized user, and with the ciphertext corresponding to both the false image points and known plaintext; receiving a proffered user image having user true image points; extracting proffered user true image points from corresponding template true image points, thereby isolating candidate false image points; generating a candidate decoding key from the candidate false image points; decoding the ciphertext using the candidate decoding key, creating a plaintext candidate; and comparing the plaintext candidate with the known plaintext. In the event that the plaintext candidate corresponds with the known plaintext, then the proffered user is considered to correspond with the authorized user. If there is no match, either another group of candidate false image points is created and re-analyzed, or a perceptible indication of authentication is provided, responsive to the step of comparison.

In still another embodiment of the present invention, it is preferred to provide a method for producing a self-authentication code for an n-dimensional image having true image points by receiving the true image points; synthesizing false image points; and selectively interposing the false image points among a preselected portion of the true image points such that the false image points are essentially hidden, thus creating a transient template. Alone, or in combination with the aforementioned method, the invention can provide a method for authenticating an n-dimensional image represented by a transient template having an authentication code therein, by receiving the transient template; identifying the template true image points and the false image points; separating the true image points from the false image points; and providing a perceptible authentication signal in response to either the true image points or the false image points. In this embodiment, it is most preferred that the template has template true image points and false image points, and that the false image points are concealed among the template true image points.

The invention can be manifested by creating an article of manufacture which includes a computer program embodied on a computer-readable medium in which an above-recited method can be embodied alone, or in combination with one or more of the above-recited methods.

BRIEF DESCRIPTION OF THE DRAWINGS

FIG. 12 is a tabular representation of variables illustrating the relationship between the number of missing true minutiae, the number of added false image points, and the relative difficulty of an attack on the enciphered information.

DETAILED DESCRIPTION OF EMBODIMENTS OF THE INVENTION

Figure 1:
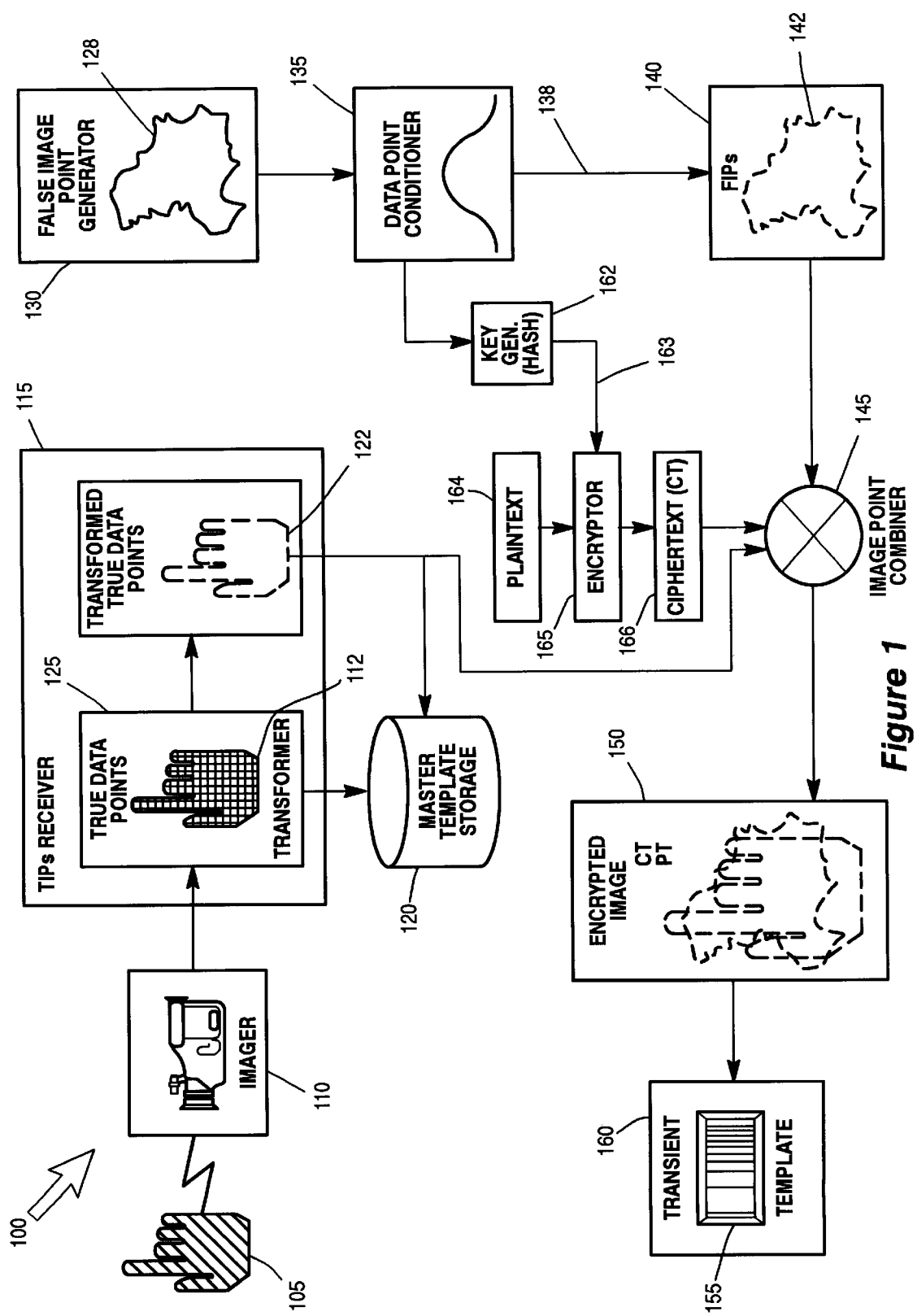
FIG. 1 is a block diagram illustration of an apparatus embodiment according to the present invention, directed primarily to key generation/enciphering.

The invention herein resolves the need for an enhanced degree of self-authentication for an entity by providing an apparatus, method, and computer program that conceals an encryption key within a structure such that the structure itself, or a representation thereof, is needed to recover the key. For example, where user identity verification employing fingerprints is desired, the user's fingerprint can be used to recover the key that, in turn, is used to authenticate the user's identity. Rather than use the true minutiae related to a user's fingerprints, it is preferred to interpose preselected false minutiae, containing the key, among the true minutiae.

Although the invention herein is described in terms of user authentication for computer-related applications, this artifice is not intended to limit the scope of the invention. Indeed, while the present embodiments are described primarily in the context of authenticating a computer user's identity using biometric data, the invention can be implemented in nearly any application for computer-related authentication, including identity verification, message origin authentication, and message content authentication. Most preferably, a key derived according to the invention herein can be a symmetric key which can be used to protect a long-term private key.

A skilled artisan would realize that the invention herein can be applied to the authentication of nearly any "structure" that is composed of an arbitrary number and type of dimensions including, for example, time, space, and combinations thereof. As used herein, the term "image" is not limited to a photographic or visually-oriented structure, but is intended to comprehend any representation of a structure. One example of a non-visual image is an audio "image" that contains temporo-spatial dimensionality in addition to other dimensions amenable to being measured or sensed, such as timbre, pitch, frequency, and the like. Furthermore, the definition of "image" can include domains other than time or space, for example, frequency.

Among the many useful supplemental resources for cryptography in general, and authentication in particular, is Bruce Schneier, APPLIED CRYPTOGRAPHY (2ND ED.), John Wiley & Sons, Inc. (New York, 1996). This text is expressly incorporated by reference, in pertinent part.

Biometrically-oriented embodiments directed to fingerprint-based authentication can use as an input structure or image sensor any sensor that can provide an image or structural representation that is unique to the user, and it is particularly preferred that such unique representation be expressed in digital form. Where fingerprints are used as the imaged structure, the sensor can include, for example, optical and capacitive sensors, whether the sensors are based on a stand-alone entry point, a scanner co-located with a workstation or a laptop computer, or even a computer mouse having a sensor embedded therein, thereby providing continuous or near-continuous live scan biometric data of the user.

Typically, an original image is represented by many discrete information points, similar to grid points on a map. True image points can be extracted from the information points on the basis of pragmatic considerations, such as data reduction. The set of true image points can be stored as a master template uniquely representative of the original image. False image points are generated and are selectively interposed among a chosen subset of the true image points, forming a transient template. The false image points also may be transformed to produce an encoding key.

It is most preferred that the encoding key itself is the result of imposing a hashing function on an ordered set of false image points that have been conditioned to be non-coincident with any true image point in the original image and to be plausible impostors of the true image points. When properly interposed among the chosen true image points, the false image points are essentially indistinguishable from the true image points without reference to the master template, the original image, or complete knowledge of the false image points. These false image points thus form the basis for the secret encryption key. The encoding key can be used to encrypt a portion of plaintext into ciphertext, and at least the ciphertext portion can be added to the minutia points in the transient template.

The term "plausible impostor" describes a state in which the characteristics of the false image points are substantially comparable to those of the true image points, preferably to the extent which make differentiation of the points exceptionally difficult, for example, through statistical analysis.

The false image point transformation and key generation methods can include one-way functions such as hashing. Collisions cannot be avoided entirely because, in general, the number of possible messages will exceed the number of possible outputs of the hash function. However, it is most preferable that the probability of collisions be low. If a function has a reasonably random output, the probability of collisions typically is determined by the function output size. Two exemplary hash functions include the MD4 and MD5 message-digest algorithms which were created by R. L. Rivest. Although algorithms more secure than MD4 do exist, such as MD5, security (as represented by the likelihood of collisions) tends not to be a significant criteria for selecting a hashing technique. Because collision weaknesses in the hash function does not significant hamper the efficacy of the disclosed invention, it is sufficient that the output be substantially random in nature, regardless of the hashing technique employed.

It is preferred that the MD4 function be used because of its relatively fast computation speed. The MD4 hash function yields a result of 128 bits, of which the policy-determined number of bits are extracted, for example by truncation, to serve as the encryption key. The key is used to encrypt, using the policy-determined encryption algorithm, a piece of randomly chosen plaintext. The encryption algorithm can be selected from many suitable secret key and public key algorithms. Both the plaintext and corresponding ciphertext can be added to the transient template.

One advantage of this invention is that the key cannot be randomly generated, or chosen. Rather, the key is the result of performing a reduction technique on information that, while containing a substantial amount of entropy, nevertheless is not completely random in nature. The resultant key, however, is effectively random. Due to these properties is thus is most preferable to use symmetric algorithms, and those asymmetric algorithms employing a private key of arbitrary value, when using the derived encryption key. Diffie-Hellman is an example of one such public key algorithm; on the other hand, RSA does not satisfy this property.

To self-authenticate, the claimant image is used to produce corresponding true image points that are extracted from the true image points of the original image held in the transient template. The residual image points include false image points. Candidate false image points (or minutiae) can be iteratively selected, and hashed to form a decryption key, with the decryption key operating on the ciphertext to produce a result which is compared with the original, known plaintext. If the decryption result does not favorably compare, the steps of candidate image point reselection, decryption key generation, ciphertext decryption, and comparison with the known plaintext continues, until the pools of candidate false image points is exhausted, or a policy limitation is reached.

To address the pragmatic considerations for implementing the apparatus and methods according to the invention herein, a selectable number of "missing" data points are accepted representing a difference between the number of true data points initially used to represent the original image and the number of true data points revealed in the claimant image. Also, the number of encoded data points implementing the encryption key (i.e., key length) can be selected. Both the acceptable number of missing points and the key length can be policy-based decisions, either under the control of a human IT system supervisor, an intelligent automated security system, or both. An embodiment of the method of setting the acceptable boundaries for these considerations also is described herein.

FIG. 1 illustrates an apparatus embodiment 100 of the invention herein, directed to encoding/key generation. A structure, or original image 105, is detected by sensor 110, for example, an imager, which represents image 105 as plural, raw true image points 112. Because the image points 122 are preferred to accurately and uniquely represent image 105, they may aptly be named "true image points" (TIPs). TIPs 112, as a whole, and as selected subsets, are uniquely representative of image 105. Sensor 110 then relays TIPs 112 to TIPs receiver 115. Depending upon the pragmatic factors of the implementation, it may be preferred that TIPs 112 be transformed or reduced in TIPs transformer 125 to transformed TIPs 122, using a preselected transformation technique. Although raw TIPs 112 can be stored in master template database 120, it may be preferred that transformed TIPs 122 be stored instead. This is particularly advantageous in large-scale systems where, in the aggregate, data representative of thousands, or millions, of images 105 are stored. If TIPs 122 are stored in database 120, it is preferred that chosen subsets of TIPs 122 be used to create the transient template.

Database 120 is usually within the confines of a secure system and, thus, it is a particular advantage of embodiments of the present invention that the authentication system disclosed herein does not have to be part of a secured system. Indeed, in preferred embodiments of the present invention, the master database 120 need not be accessed at all during user authentication.

False image points (FIP) 128 can be created by FIP generator (FIPG) 130, with the FIPs 128 preferably having a substantial degree of entropy, i.e., having a highly-random content. It also is preferred that FIPG 130 provide FIPs 128 that are plausible impostors of TIPs 122, or that a data point conditioner 135 be employed to so constrain the nature of FIPs 128 and, further, to preferably create a constrained and ordered set of FIPs 138. The notion of "plausible impostor" will described in further detail in the context of FIGS. 3 and 4. As before, it is preferred that the stored population of TIPs (112 or 122) act as the reference population for determining the characteristics of "plausible impostor" FIPs.

FIPs 138, again preferably constrained and ordered, are received by FIP key generator 140 which, in turn, generates a key 142, using a preselected key generation technique. One preferred embodiment of the present invention implements key generation through a hashing function, for example, the MD4 hashing technique.

TIPs 122 and FIPs 142 are then preferred to be selectively interposed using an image point combiner 145 which produces composite image 150. The composite image can then be stored as transient template 155 on user credential 160. The transient template 155, for example, can be stored in a memory device and the user credential 160 on which template 155 is stored can be a smartcard used, for example, to identify and grant access to, an employee.

Although generated to possess a high degree of entropy, it is nevertheless preferred that the selection of FIPs 142 be constrained to minimize overlap or interference with TIPs 122, in addition to being plausible impostors of TIPs 122. Furthermore, it is preferred that key generator 140 create a key using a reversible (i.e., decodable) method that imposes a sufficiently high decoding cost to make an attack without knowledge of the reversible method greater than the potential gain realized by the blind attack.

In general, the greater the number of FIPs used, the more difficult it is to correctly identify the entire FIP set without a priori knowledge of TIP or FIP placement, or both. The selected number of FIPs can be tailored to suit the desired level of security achieved through self-authentication. Likewise, in providing the TIPs it is understood that desired level of security can determine the number of points in the TIP set, as well as the number of missing TIPs that may be encountered during the process of decryption. Therefore, the size of the TIP set representing the original image, the length of the encryption key represented by the encoded image points, and the number of missing data points in the decoded TIPs set are all selectable and can be subject to policy decisions.

When the FIPs are selectively interposed upon, and hidden among, comparable TIPs, using image point combiner 145, the identification, isolation, and manipulation of both FIPs and TIPs can be very difficult, unless an attempted intruder has essentially complete knowledge of the FIPs, the algorithms generating the encoded image points, or possesses a copy of the original image.

When this embodiment is implemented using key generator 162, the key 163 can be used to encode a selected portion of plaintext 164 according to a preselected encoding algorithm as implemented in encryptor 165, thus creating a corresponding ciphertext portion 166. The ciphertext portion 166 can then be added to the transient template holding the selectively interposed FIPs and TIPS. In the alternative, a composite structure containing both ciphertext 166 and the plaintext 164 can be added to transient template 155 by image point combiner 145. It is preferred that encryption of the plaintext 164 in encryptor 165 be effected by one of a symmetric encryption technique or an asymmetric encryption technique, with the corresponding private key having an arbitrary value.

Figure 2:
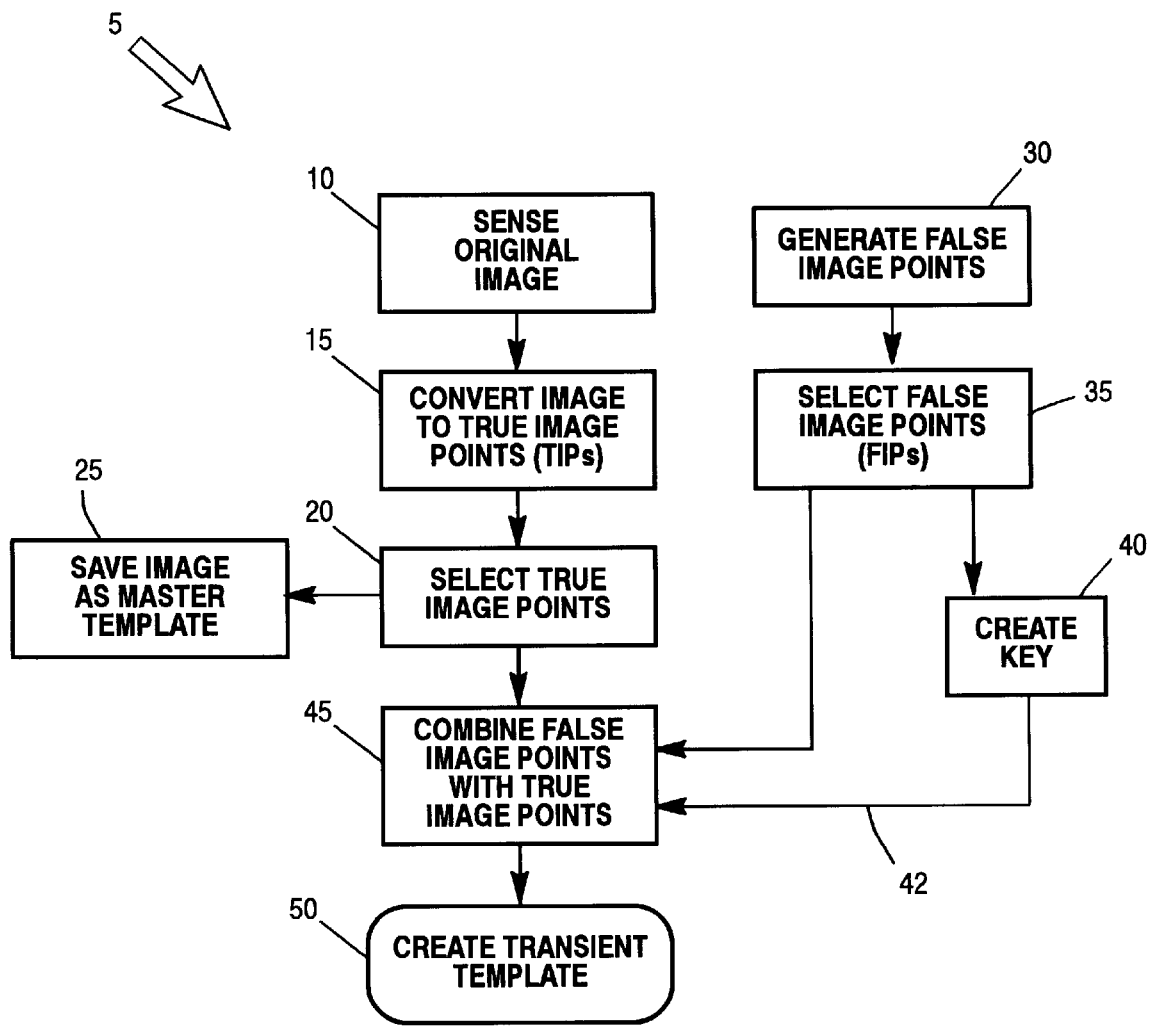
FIG. 2 is a block illustration of a method embodiment according to the present invention, directed primarily to key generation/enciphering.

FIG. 2 illustrates a method embodiment 5 of the invention herein, also primarily directed to key generation/encoding.

An original image is sensed, step 10, and converted to multiple true image points (TIPs), step 15. It is preferred that the TIPs be selected, step 20, as a chosen subset of the TIPs created in step 15. If desired, the TIPs also can be reduced or transformed in step 20 as dictated by the application. The reduced or transformed TIPs then can be saved as a master template of the original image, step 25. Alternatively, the TIPs can be saved as a master template, step 25, without the intervention of data reduction, step 20. Storing the master template, step 25, allows for recall and comparison at a later time, within the secured system maintain the master database, if such is desired. As stated above, it is an advantage of the present invention that, while authenticating users, it is not required to be part of, or make reference to, a secured system. Whatever TIPs are stored, however, a chosen subset of the stored data is most preferred to constitute a component of the transient template.

False image points (FIPS) can be generated, step 30, which are preferred to be selected as plausible impostors of the TIPs, step 35. A key 38 can then be generated, step 40, from the selected FIPs. The key generation, step 40, is preferred to be effected by hashing. Also, in an embodiment of the invention herein, step 40 is preferred to be hashing an ordered set of non-coincident plausible impostor FIPS.

It is preferred that the FIPs be selectively combined with, or interposed among the TIPs, step 45, such that it becomes difficult to distinguish FIPs from TIPs. It is further preferred that a transient template be created with this interposed data, step 50.

In another preferred embodiment of the present invention, step 40 can include the steps of hashing the FIPs, step 42, for example using the MD4 hash technique, to produce a 128-bit encryption key and, using the 128-bit key, encrypting a well-known pattern (plaintext), producing a composite structure 42 which includes both plaintext and the associated ciphertext. The composite plaintext/ciphertext structure 42 can then be added to transient template during the creation of transient template at step 50.

Figure 3A:
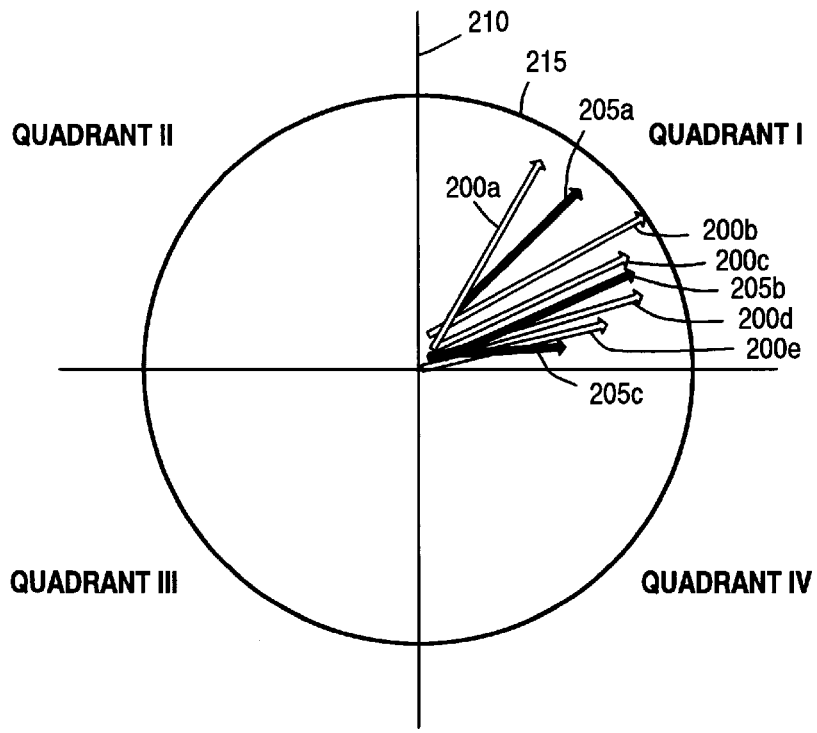
FIGS. 3 and 4 are vector diagrams around a unit circle illustrative of true image points and plausible and implausible impostors thereof.
Figure 3B:
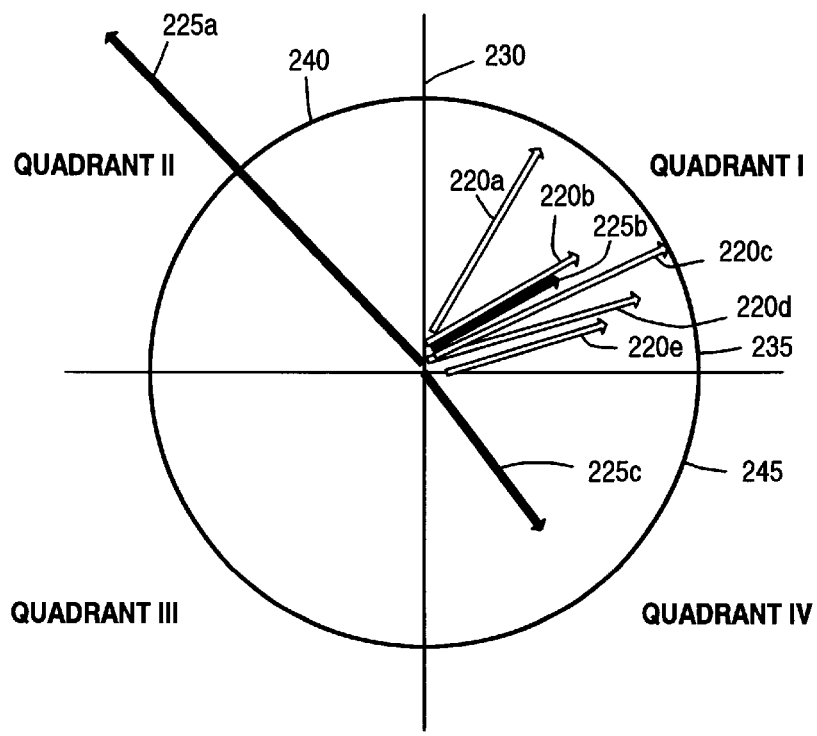
Figure 4:
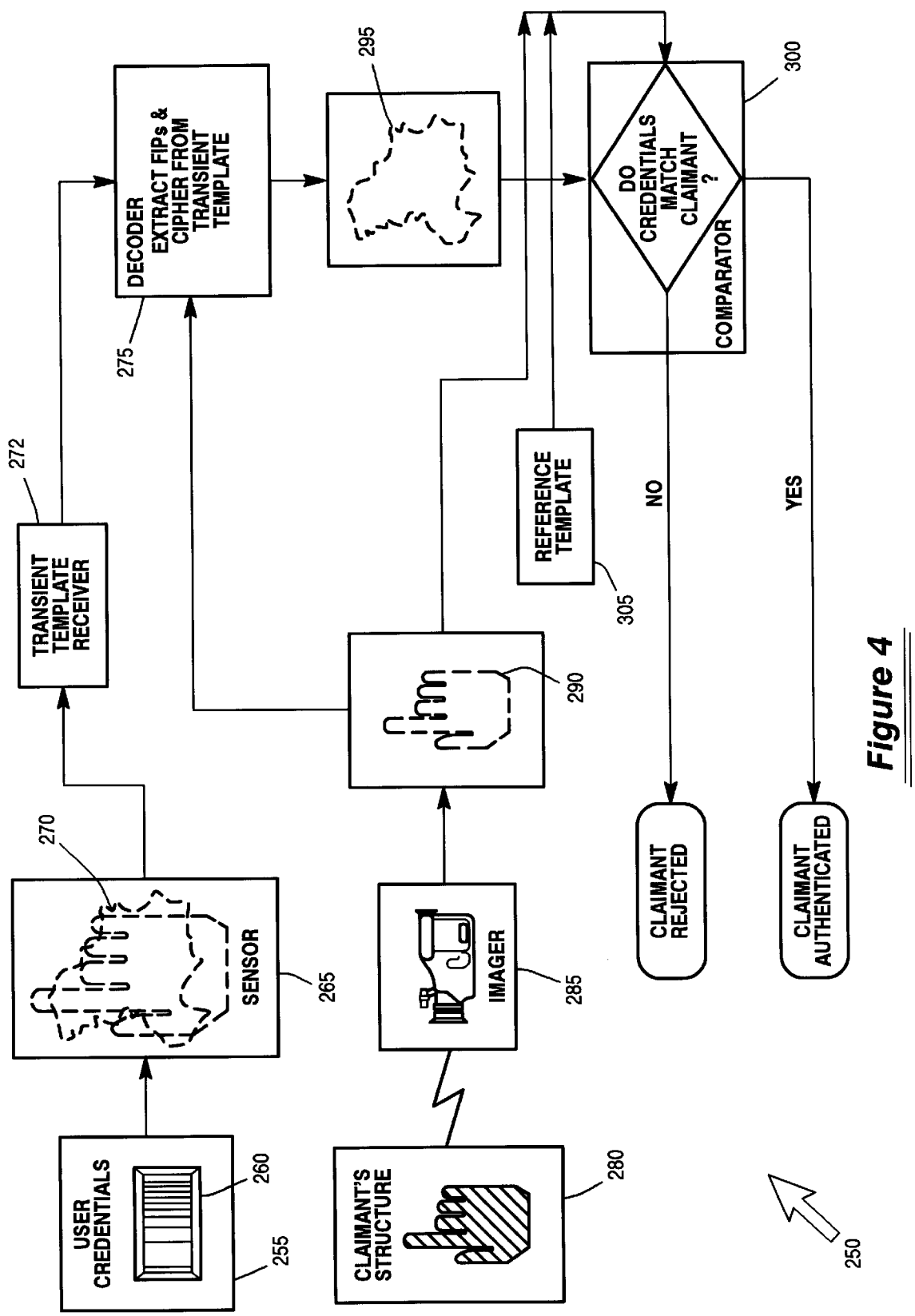

FIGS. 3 and 4 illustrate the plausible impostor implementation. In FIG. 3, assuming that TIPs 200*a–e* can be characterized as having magnitudes and directions, with a maximum magnitude 210, and directions generally oriented, for example, to Quadrant I, 215. FIPs 205*a–c* would be plausible impostors if they, too, can be characterized by magnitudes and directions comparable to those of TIPs 200*a–e*. There is no requirement that TIPs 200*a–e* and FIPS 205*a–c* have identical ranges, or that the values for FIPs 205*a–c* fall completely within the ranges manifested by TIPs 200*a–e*. It is sufficient that the false and true data points are sufficiently comparable, so to resist discovery of either type of data point, for example, by a statistical characterization thereof. Additionally, it is very desirable to select FIPs that do not coincide with, and are distinguishably different from, the TIPs selected for the master template.

In FIG. 4, FIPs 225*a–c* would not be plausible impostors of TIPs 220*a–e,* if the range of magnitudes or primary directions for FIPs 225*a–c* significantly differs from those of TIPs 220*a–e*. In FIG. 4, FIP 225*a* has a magnitude nearly twice as large as maximum TIPs value 230, and a direction primarily oriented to Quadrant II, 240. Although FIP 225*c* has a magnitude within the range of maximum TIP value 230, it is oriented primarily to Quadrant IV, 245. If an attacker had knowledge that TIPs were primarily oriented to Quadrant I, 235, then FIPs 225*a* and 225*c* are implausible impostors, simplifying the identification of the TIPs 220*a–e* for the attacker. It is desirable to create FIPs that are plausible impostors in order to enhance the concealment of the key, as described below. If either FIPs, TIPs, or both, could be discerned over time, an intruder might be able to detect and manipulate the image points to suit the intruder's ultimate goals.

Figure 5:
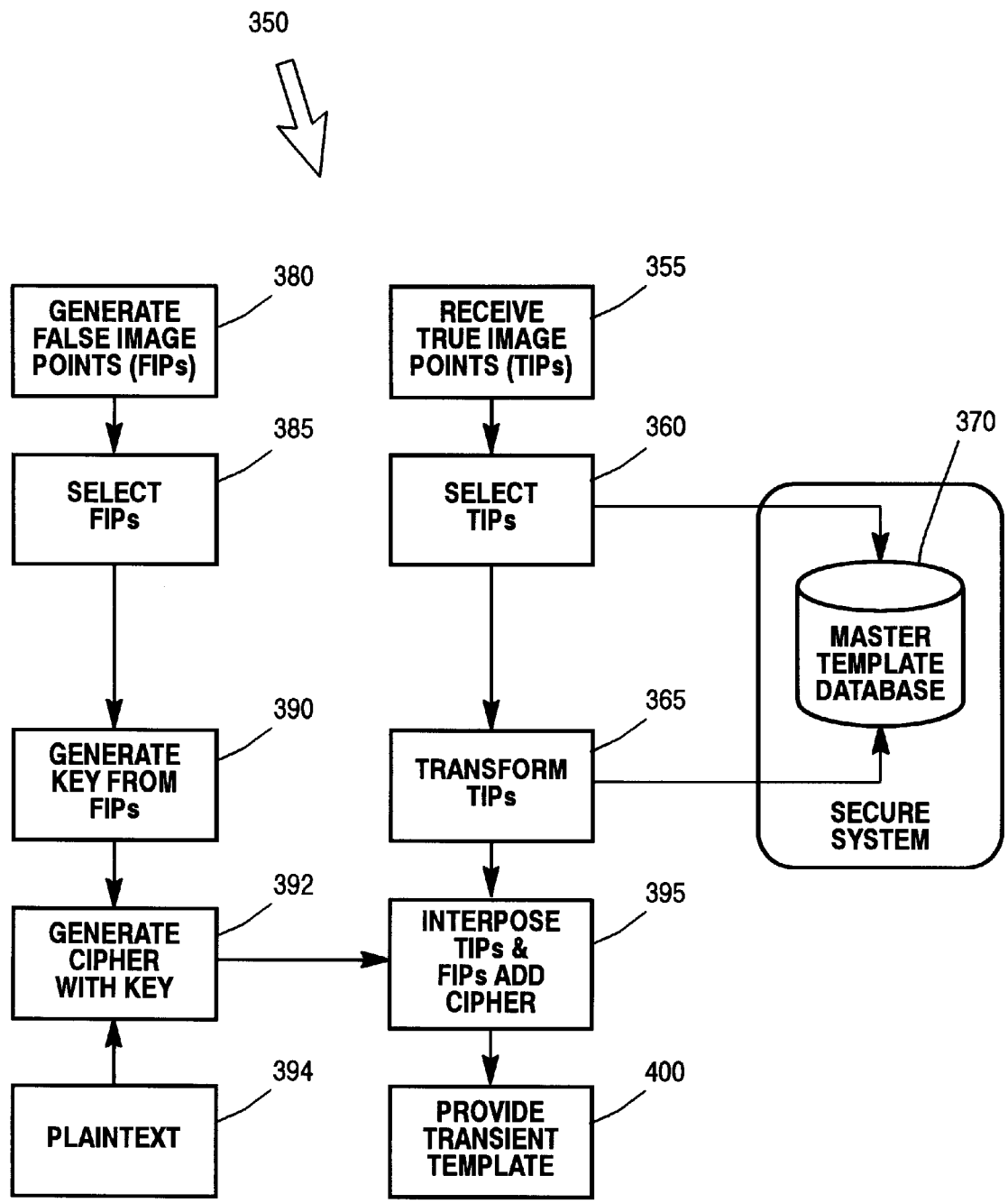
FIG. 5 is a block diagram illustration of an apparatus embodiment according to the present invention, directed primarily to key extraction and authentication.

FIG. 5 illustrates an apparatus embodiment 250 of the present invention, primarily directed to key decoding/authentication. Imager 285 detects claimant structure 280 to produce claimant TIPs 290. Transient template 260, which can be borne on user credential 255, such as a magnetic strip card or smart card, is detected by sensor 265 from which the image 270 is obtained and received by transient template receiver 272. In one embodiment of the present invention the image can be a secret-encryption-key-bearing encoded image. Decoder 275 is used to extract candidate FIPs 295 from image 270. In one embodiment, the candidate FIPs 295 are yielded by extracting claimant TIPs 290 from the image points on the transient template. Where ciphertext is included in the transient template, decoder 275 also can be used to form a candidate decoding key from FIPs 295, and the decoding key can be applied to the ciphertext to produce a result which is compared with the known plaintext. If the result matches the known plaintext, authentication is indicated. If not, additional candidate FIPs are assembled to form an additional decoding key. This process continues until all combinations of false image points are exhausted or a policy limit is reached, the lack of authentication is indicated and the claimant is rejected.

Comparator 300 verifies that credentials 255 match the claimant structure 280, or provides an indication that the claimant structure 280 does not sufficiently match the offered credentials 260. Comparator 300 can employ information interposed within the image 270, from a reference template 305, or both. In some embodiments of the present invention, a rejection could arise from an inadequate sensing of structure 280 by imager 285 leading to missing TIPs (a false negative), or by truly misrepresented credentials (a true negative). As indicted earlier, the degree to which false negatives are accepted, can be adjusted by policy-based factors, including the acceptable number of missing true minutiae, or TIPs from structure 280, for example, as compared with a reference template 305.

In certain embodiments of the invention herein, it is most preferred that the candidate FIPs 295 include key having a plaintext pattern and an encoded ciphertext pattern appended thereto. In such embodiments, comparator 300 can compare the plaintext component of the composite key with the decrypted ciphertext, thereby authenticating credential 255.

The details of the employed encoding methods are often readily available to determined attackers, as are image copies such as latent fingerprints. However, possession of a transient template is dependent upon the mode of implementation of the invention and can present a greater difficulty for the attacker. One particularly secure mode consists of a smartcard used to hold the transient template. An attacker then would need to gain physical possession of the smartcard. In the smartcard mode of implementation, the transient template is held on the smartcard. The smartcard can be a standard PIN-activated smartcard, and not one especially designed to accept fingerprint technology. As stated before, however, embodiments according to the invention herein have the advantage of operating without reference to an external, secure reference system.

In another embodiment of the invention, an encrypted PIN could be held on the card itself. This technique avoids the complication of needing an on-line database to supply the PIN, but requires that a balance be struck with database security. In many instances, however, this technique is appropriate in real-world consumer transactions. To provide authentication, therefore, the transient template is read from the card, and the image, for example, a fingerprint, is read and used to extract the secret key. The secret key decrypts the encrypted PIN held in the user database, and the PIN is used to gain access to the secret authentication information held on the card.

Figure 6:
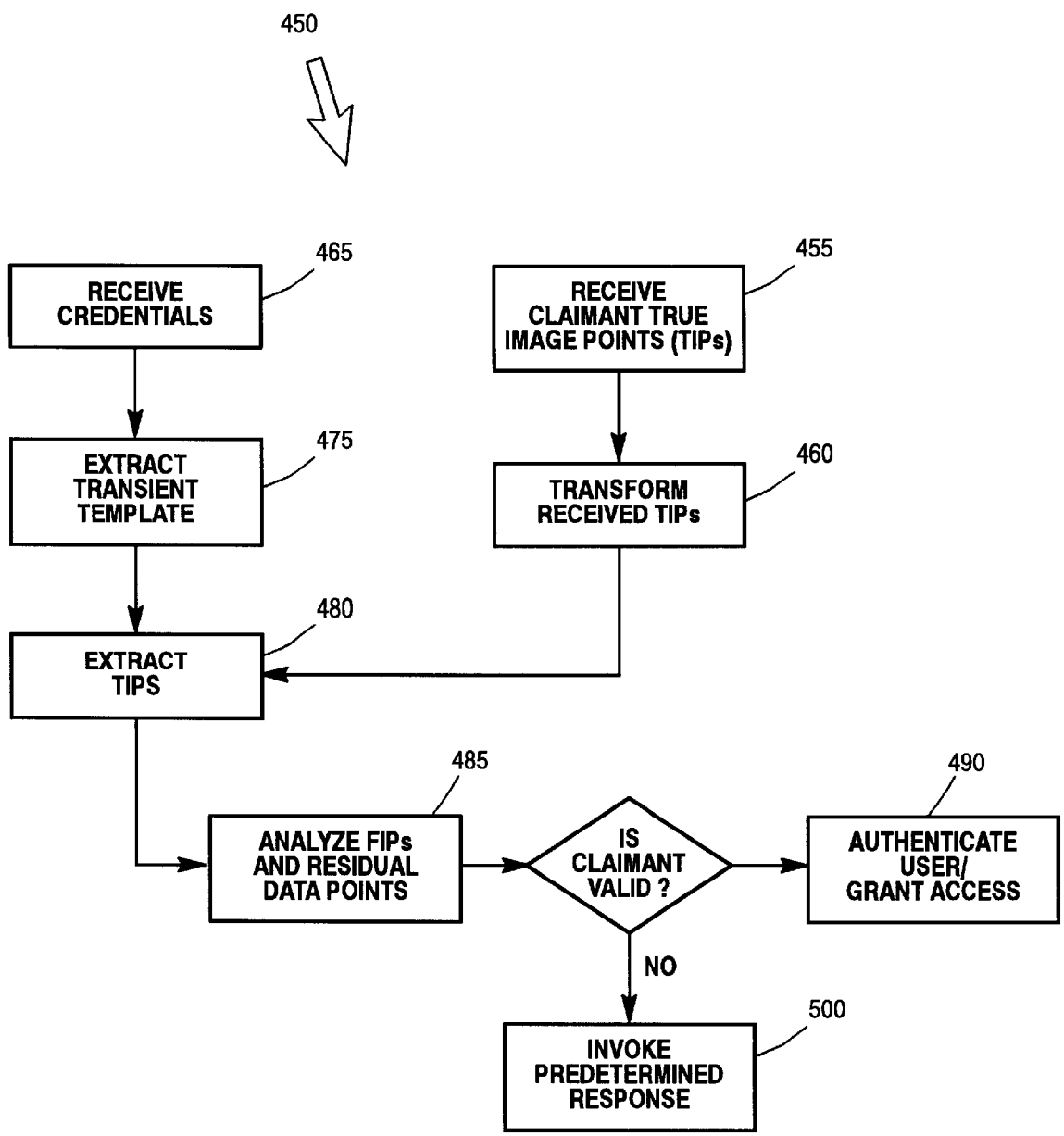
FIG. 6 is a block diagram illustration of another method embodiment according to the present invention, directed primarily to key encoding and enciphering.

Another method embodiment 350 of the present invention, primarily drawn to encoding, is illustrated in FIG. 6. True image points (again, TIPs) are received, step 355, and are chosen according to a predetermined selection technique, step 360. The TIPs can be further reduced or transformed, step 365, according to a predetermined transformation technique. In certain embodiments of the present invention, it is preferred to randomly-select one-half of the offered TIPs from which to construct the transient template.

The TIPs can be stored on a master template database, step 370, after transformation step 365, if desired. Ultimately, it is most preferred that the chosen TIPs used to construct the transient template be selected from the pool of TIPs, whether or not transformed or reduced, that are stored on the master template database.

As in previously-described embodiments of the invention, it is preferred that FIPs be generated, step 380, and be selected, step 385, so that they may be suitably combined with the selected TIPs. Again, the selected FIPs are preferably plausible impostors of the TIPs that have been constrained to not coincide with any of the actual TIPs stored in the master database for that user. The selected FIPS are selectively interposed, and concealed, among the selected TIPs, step 395, to provide a transient template, step 400. In certain implementations, a key is created, step 390, which key is used to create ciphertext, step 392, after well-known plaintext is input, step 394.

Another mode of implementation for selected embodiments of the present invention is the distributed user database mode. In this mode, the user's transient template is held in a distributed database, so that wherever in the network a user happens to gain access to the IT resources, his transient template is available. The user's credentials wallet would be present also in the user database. The credentials in the wallet are encrypted using the key hidden in the transient template. By the nature of this implementation mode, all users'transient templates are public information-since they are being used to effect authentication, pre-authentication can be an unreasonable requirement for their access.

In accordance with one embodiment of a decoding method, claimant TIPs, which can be reduced or transformed as necessary, are received in a manner similar to a reduction or transformation indicated in FIG. 6. Contemporaneously, the method can include receiving credentials, from which a transient template is extracted. The transient template can include template TIPs and FIPs. Claimant TIPs are extracted from the template TIPs, leaving behind FIPs and, perhaps, residual data points. In preferred embodiments of the present invention, the FIPs can contain authenticating indicia, thus the FIPs are analyzed to determine whether the claimant template is valid. If the FIPs analysis reveals that the received credentials and the claimant TIPs compare favorably, then the claimant will be authenticated. Otherwise, the claimant will be rejected and a predetermined response will be invoked. Such a response can include requesting that the claimant re-offer his biometric data or the credentials, or alerting a security system to the presence of a potential attacker.

One particularly preferred implementation of FIPs analyses is described with respect to FIG. 11, below.

Biometric Embodiments

Biometric data are becoming more feasible as a source of inexpensive, readily-obtained, and verifiable user credentials. Certain physical features of the human body are relatively unique from individual to individual. Facial photographs and fingerprints have long been used for personal identification, particularly by law enforcement agencies. Biometric authentication is the measurement of a unique biological feature used to verify the claimed identity of an individual through automated means. The biometric authentication mechanism is intended to measure a unique biological feature to the degree that only one person may be authenticated as a specific user. The biological feature may be based on a physiological or behavioral characteristic. The physiological characteristics measure a physical feature such as a fingerprint or face. The behavioral characteristics measure a reaction or response, such as a signature or voice. The most frequently used biometrics are fingerprint, retinal, and voice authentication images.

Figure 7:
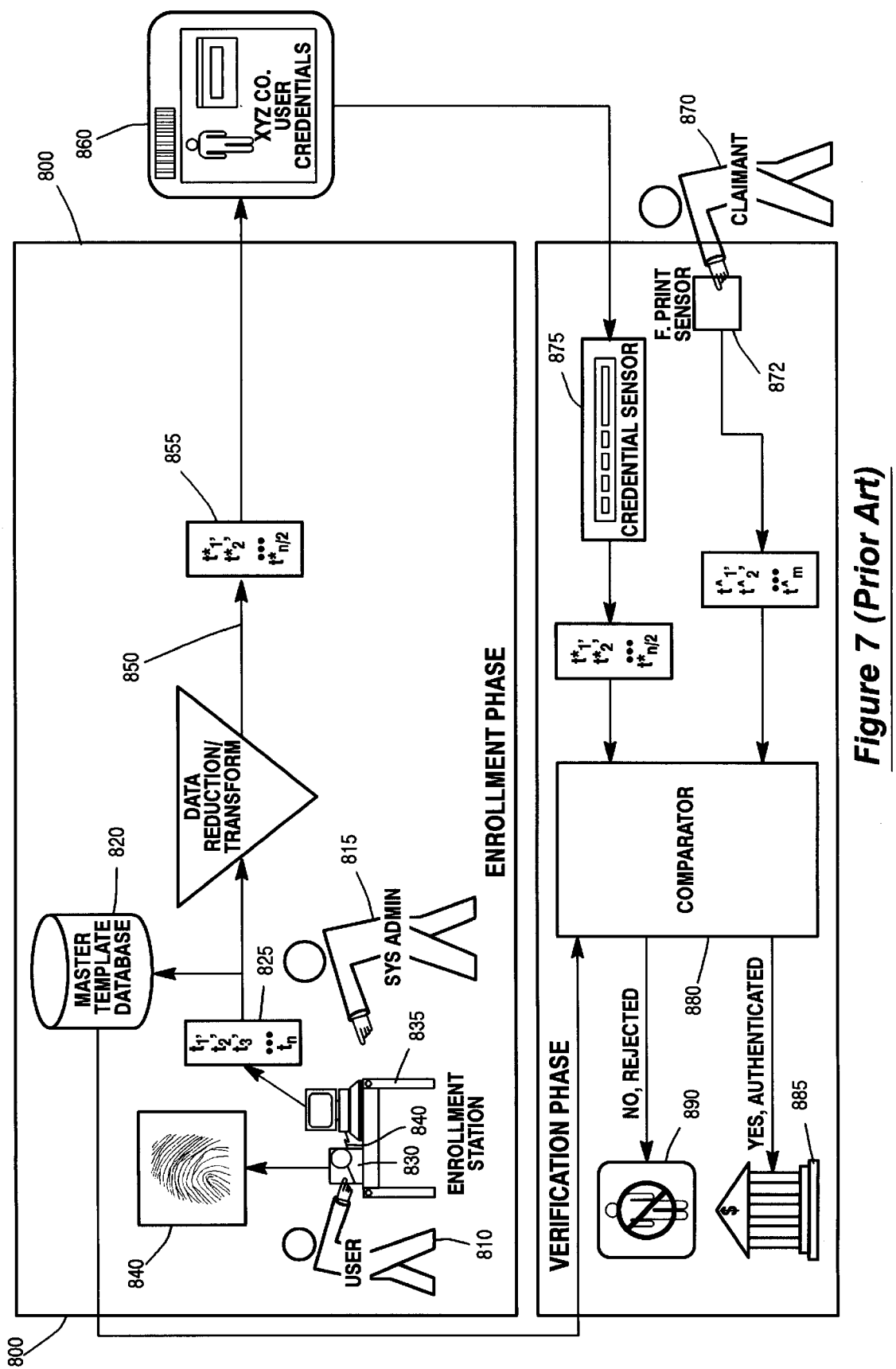
FIG. 7 is an illustration of a biometric-based authentication system in the prior art.

Existing biometric authentication methods typically employ two modes: enrollment, step 800, and verification, step 805, as illustrated in FIG. 7. For initial use of the biometric, each user 810 must be enrolled, step 800, by a system administrator 815 who verifies that each individual being enrolled is an authorized user. The enrollment process includes the storing, step 820, of a data set 825 representative of an individual's biological feature (physical characteristic or personal trait) to be used later to verify the user's identity. Physiological biometrics generally tend to have a more desirable false acceptance rate than a behavioral characteristic, because (1) the measured physiological characteristic tends to be more stable, and because (2) behavior is prone to being duplicated by other users.

The targeted biological feature typically is acquired by sensor 830 during enrollment step 800, which is usually part of enrollment station 835. Sensor 830 produces a signal 840 which is representative of variations in the physical quantity being measured. If, for example, the sensor is a microphone used to capture a voice pattern, the microphone will produce a signal whose amplitude (voltage or current) varies with time in response to the varying frequencies in a spoken phrase. Where fingerprints are used, pattern discontinuities unique to the fingerprint 840 of user 810 can provide the desired identifying data.

Because raw sensor data may be voluminous, biometric systems often process this data to extract only that information 855 relevant to the authentication process, as shown at step 850. Further processing may be done in order to enhance differences and compress data. Once the digital representation, called the transient template, has been processed to the desired point, it is then stored, usually in some form of user credential 860. Note that credential 860 contains true image information obtained from a live scan of user 810.

Some biometric devices take multiple samples during enrollment step 800 to account for degrees of variance in the measurement of these features, and develop a template that, while approximate, nevertheless uniquely identifies an individual within a pre-selected, statistically-influenced range of false-positive and false-negative responses, that is deemed to be acceptable for the application at hand.

Once the user is enrolled, the biometric is used to verify the user's identity, step 805. When claimant 870 needs to be authenticated, a sample 872 of the user's biological feature is sensed, digitized, and processed. The digitized sample is compared to the stored biometric template, step 875, here stored in credential 860. The live scan sample 872 typically does not exactly match the user's stored template on credential 860.

A comparison algorithm used in comparator 880 yields a result of how close the live scan is to the stored template. If the result falls into an "acceptable" range, an affirmative response is given, step 885; if the result falls into an "unacceptable" range, a negative response is given, step 890. What is "acceptable" can vary, for example, with the type of biometric being sensed, the natural variations in the scanned individuals, the sophistication of the biometric authentication device used, and the environment in which the scan takes place.

Although biometric data can be more convenient to use for authentication purposes, nevertheless, storing true biometric data from a live scan which forms the basis for the unique user identification, can be prone to compromise by an attacker. Once this true data is compromised, the particular biometric entity of interest may be rendered useless. For example, compromised sets of true fingerprint data may have the consequence that the respective users can no longer use their fingerprint to effect authentication.

The following combined preferred embodiments of the present invention offer an additional level to biometric authentication systems that currently is unavailable in the prior art.

Figure 8:
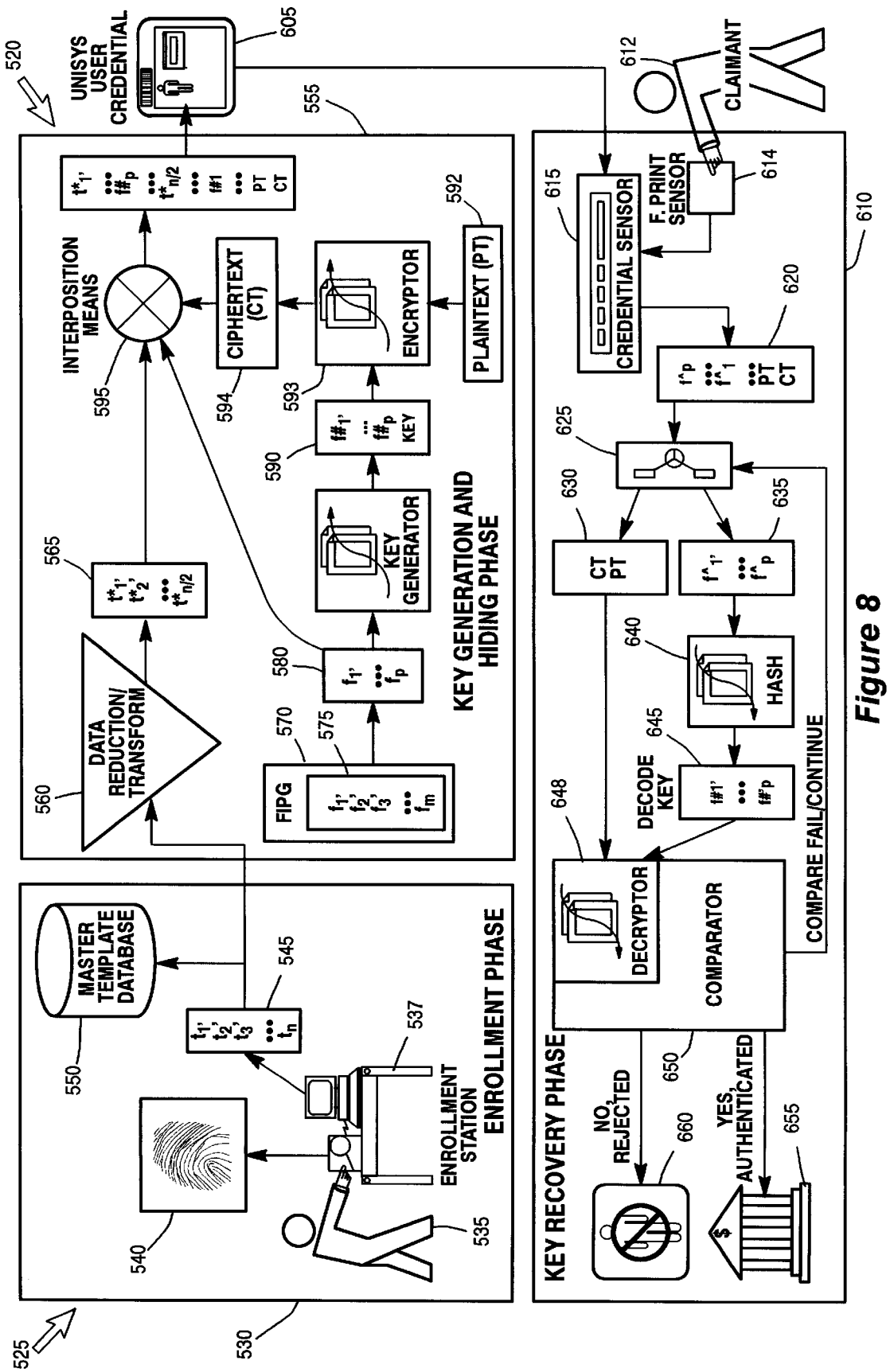
FIG. 8 is an illustration of a biometric-based authentication system according to embodiments of the present invention.

Combined Embodiments Comprising A Biometric Authentication System Using Fingerprints Turning to FIG. 8, one embodiment for an apparatus 520, and an associated method 525, is illustrated in the specific context of biometric authentication using a human fingerprint. Apparatus 520 and method 525 are thought to be resistant to the compromise described relative to the prior art system in FIG. 7, because (1) only a preselected subset of the true information is used; (2) false information is selectively interposed and concealed among the true information points; and (3) the false information can contain a code to verify the authenticity of the presented credentials.

Figure 9:
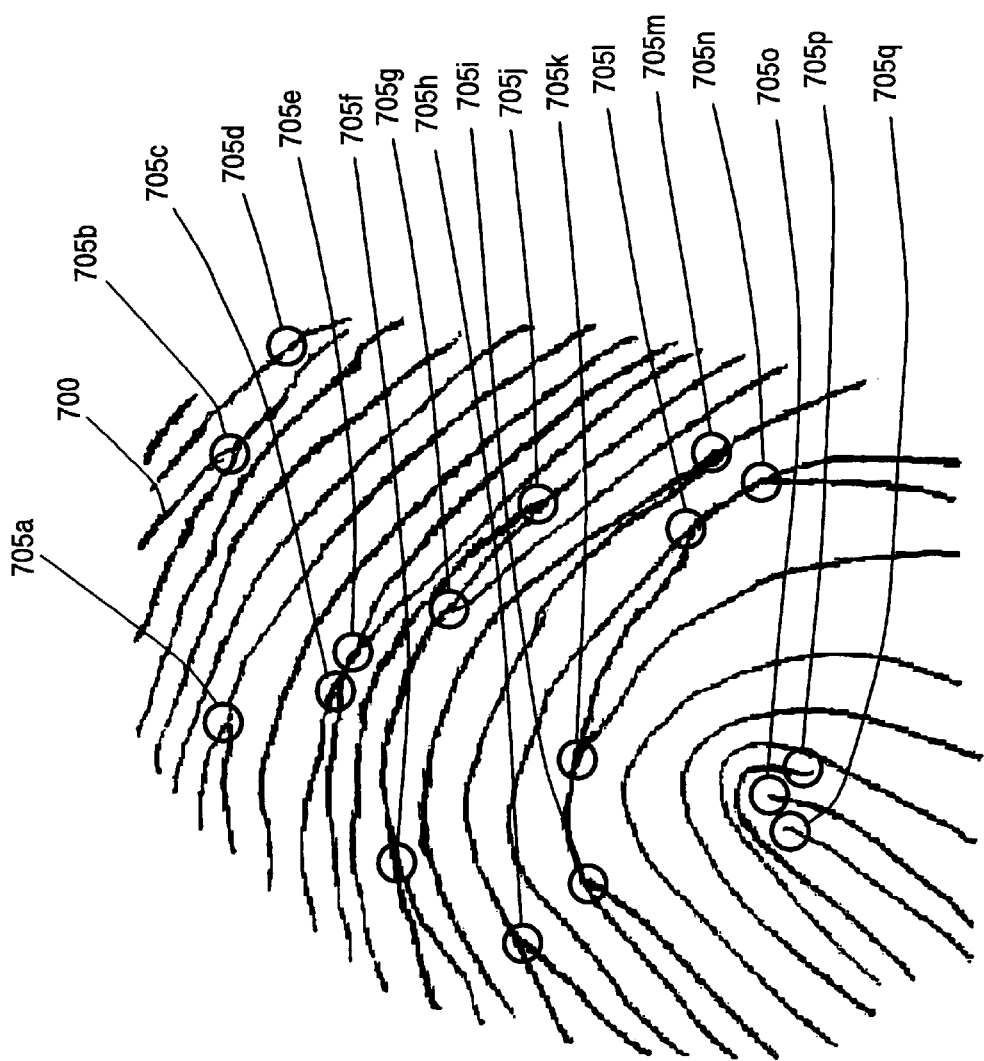
FIG. 9 is a diagrammatic representation of a fingerprint illustrating discontinuities in the fingerprint.
Figure 10:
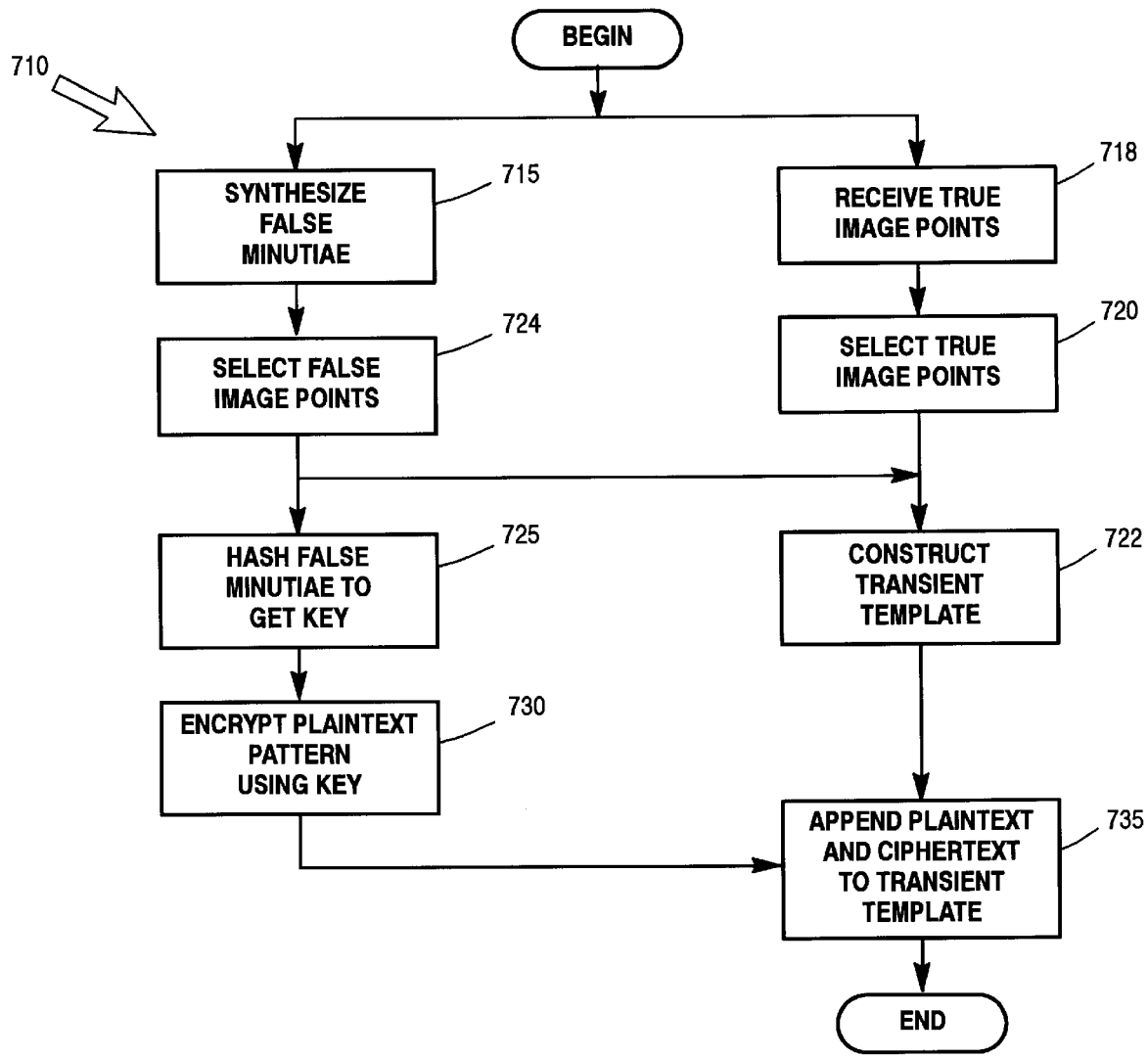
FIG. 10 is another method embodiment according to the present invention, including plaintext/ciphertext creation techniques.

In FIG. 8, the preferred method embodiment 525 uses three phases of operation: enrollment, step 530, key generation and hiding, step 555, and key recovery, step 610. FIGS. 9, 10, and 11 also are discussed in conjunction with FIG. 8, illustrating aspects of the enrollment phase, 530, the key generation and hiding phase, step 555, and key recovery phase, step 610, respectively.

Enrollment Phase

In the enrollment phase, step 530, the fingerprint 540 of user 535 is read at enrollment station 537. As illustrated in FIG. 9, fingerprint 700 is uniquely represented as a set of minutia points 705*a*–*q* which describe certain discontinuities in the fingerprint pattern, such as ridge endings and merges. The values of minutia points 705*a*–*q* in FIG. 9 generally correspond with TIPs vector 545 in FIG. 8. Presently, it is preferred that each minutia point is described by a 10 byte vector. Minutia-related vector 545 can form the master template for user 535, which can be stored in master template database 550 for later recall and use. Enrollment phase, step 530, can advantageously use the devices and techniques of the existing art to the extent that a unique representation of user 535 can be obtained via the chosen biometric.

Key Generation and Hiding

Key generation and key hiding, step 555, constitute the next phase of method 525 using apparatus 520 in FIG. 8. In step 555, the structured digital representation of the fingerprint is comprised of true image points, TIPs, 545. Where suitable, data transformer 560 can provide a data vector 565 that is a selected subset of raw TIPs vector 545. While step 555 in FIG. 8 is from the perspective of an apparatus, FIG. 10, which follows, illustrates one process 710 which can be implemented in FIG. 8.

In FIG. 8, FIPs generator (FIPG) 570 can synthesize a vector 575 which includes a selectable number of false image points FIPs, having a highly random content. It is preferred that vector 575 be conditioned such that FIPs vector 585 is an ordered set of values which are plausible impostors of TIPs 545.

Using a preselected key generation technique in key generator 585, an encoding key 590 is generated. Chosen TIPs 565 and FIPs 590 are selectively combined and hidden by interposition means 595, to produce transient template 600. Encoding key 590 can encrypt a portion of plaintext 592 using encryptor 593 to produce a corresponding portion of ciphertext 594. The corresponding plaintext 592 and ciphertext 594 can be included in template 600. Template 600 is stored on user credential 605. Note that this embodiment does not require the use of secret- or public-key encryption techniques, because hashing alone can provide the desired result.

FIG. 10 illustrates, in method 710, an embodiment of the key generation and hiding shown in FIG. 8 (step 555). First, false minutiae (FIPs) are synthesized, step 715, such that the false minutiae lie at a safe distance from, but are plausibly related to, neighboring true minutiae. Next, a preselected portion of the true minutiae (TIPs), i.e., those found in the master template, are chosen, step 720, and the selected FIPs are selectively interposed to form the transient template, step 722.

It is preferred that the transient template consist of a preselected number of true minutia points (TIPS) from the master template plus the FIPs. It is more preferred that the TIPs be chosen randomly from the master template, and most preferred that one-half of the minutia points from the master template be used in the transient template. This preference is because using exactly half of the minutia points yields the maximum number of possible combinations available from the set of minutia points in the master template.

One advantage of using a randomly-selected half of the true minutiae in the master template is to obfuscate the identity of the false minutiae when the false minutiae are rolled over to effect key refresh. This property can minimize the problems that arise from using immutable characteristics such as the true minutiae from a fingerprint, and reduces the process of key refresh to the selection of new false minutiae. Even if the selected potion of the total set of true minutiae are compromised, other randomly-selected true minutiae can be chosen from the securely-stored master template and used to create a new transient template without the need for re-enrollment by the user.

Continuing in FIG. 10, the false minutiae (FIPs) can be hashed to form an encryption key, step 725. In certain preferred embodiments, hashing step 725 employs the MD4 hashing technique to form, for example, a 128-bit key. The 128-bit key then can be used to encrypt a well-known pattern, or plaintext, step 730 to create a corresponding ciphertext. Alternatively, the 128-bit key can be subject to a truncation function, if desired. In step 735, the plaintext/ciphertext pair can be added to the transient template.

Key Recovery

Continuing in FIG. 8, the key recovery process, step 610, is presently described. Claimant 612 presents credential 605 to credential sensor 615 contemporaneously with providing a live fingerprint scan from fingerprint sensor 614. Transient template 620 is then extracted from credential 605. From template 620 is extracted candidate FIPs vector 635, as is the plaintext/ciphertext structure 630. If claimant 612 is the same person as represented by the data encoded into credential 605, as determined in comparator 650, the fingerprint scan TIPs read in sensor 614 will correspond with the proffered TIPS vector from credential 605. After the scanned TIPs are extracted from the proffered TIPs, there will remain the set of FIPs data 635, which can be hashed in decode key generator 640 to produce decode key 645. Key 645 is then used to decrypt the ciphertext in structure 630 within decryptor 648, which can be part of comparator 650. If the candidate plaintext matches the template plaintext, an indicia of authentication 655 is provided. Otherwise, an indicia of claimant rejection 660 will be provided.

In one embodiment of the invention, a separate field can be created within the transient template, that field consisting of a random string plus its ciphertext under the hidden key. However, in another embodiment of the invention, the lowest valued true minutia point can be used as the plaintext. By simply keeping the corresponding ciphertext as the comparison field, the plaintext may not be obvious to an attacker.

Figure 11:
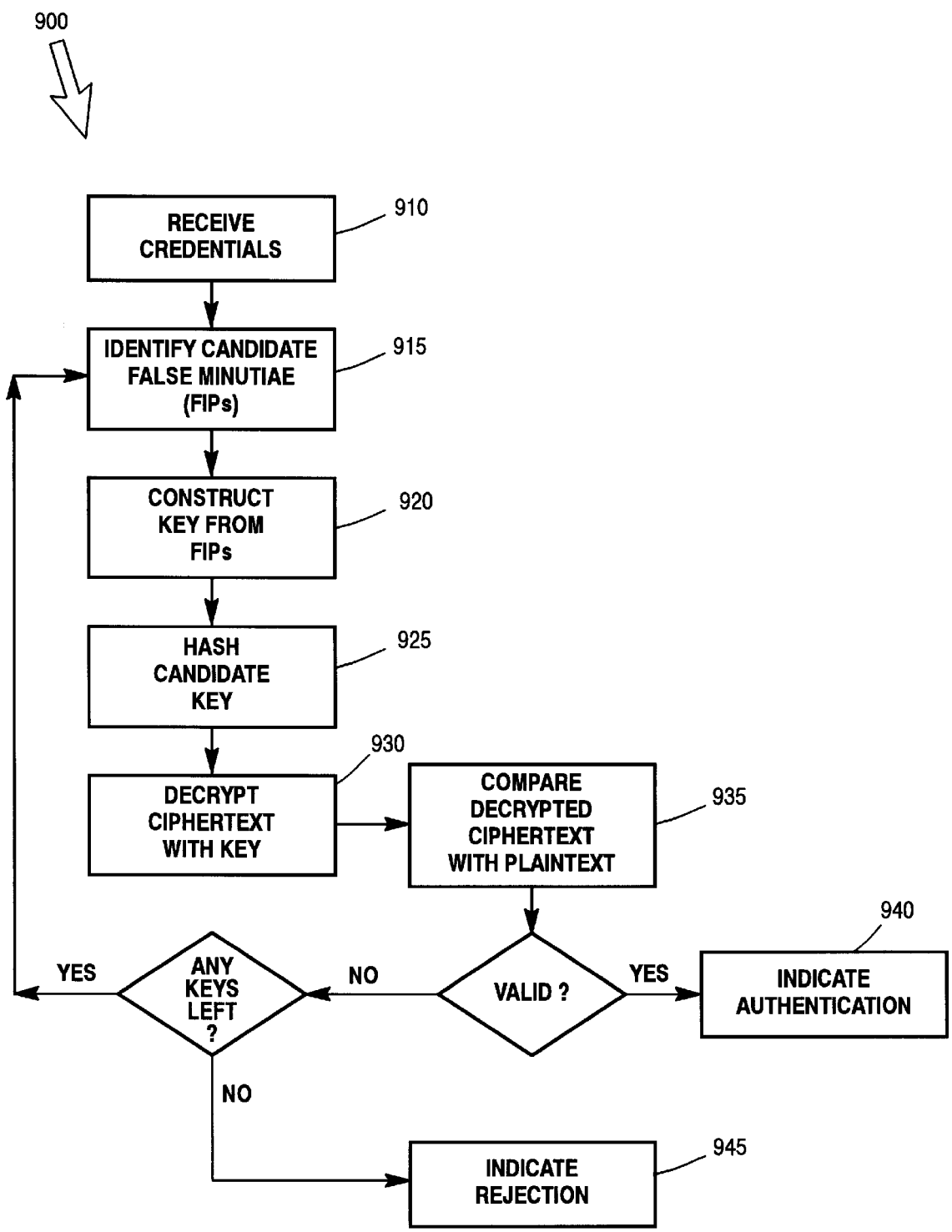
FIG. 11 is another method embodiment of the present invention illustrating one application of plaintext/ciphertext decoding and authentication techniques.

FIG. 11 illustrates one embodiment of the key recovery process 900 similar to the process indicated in FIG. 8, step 610. In process 900, it is assumed that a plaintext/ciphertext pair has been appended to the transient template. Process 900 can begin by receiving user credentials, step 910. Among the information points embedded within the credentials are both false and true information points which correspond to false and true minutiae, respectively. From the transient template, candidate FIPs, or false minutiae, are identified, step 915, from which a candidate key is constructed, step 920. The candidate key is hashed, step 925, and the hash result is used to decrypt the ciphertext component, step 930. The decrypted ciphertext component is compared with the plaintext component, step 935, and if the comparison is within the predetermined range of "acceptable," then authentication is indicated, step 940. Otherwise, if sufficient candidate FIPs remain from which additional keys can be constructed, process resumes at identifying the FIPs, step 915. Once the key combinations have been exhausted, a preselected comparison limit is reached, or the like, rejection of the user credentials relative to the claimant is indicated, step 945.

Because of the non-deterministic nature of fingerprint sampling, some true minutiae that are present in the transient template may not occur in the sample. An effect of these missing minutiae is the consequence that the key recovery mechanism will need to try a number of combinations before arriving at the correct key. The maximum number of trial combinations is given by the combinatorial $_nC_r$, where n is the number of false minutiae plus number of missing minutiae, and r is the number of false minutia points in the template.

In a present embodiment of the invention herein, the number of false minutiae added in the process of constructing the transient template is a function of the governing policy of the particular IT environment. That policy, inter alia, determines the permissible degree of latitude in declaring a match between a presented finger and an enrolled finger. One factor used to establish the permissible degree of latitude is the maximum permissible number of true minutiae or TIPs missing from the transient template sample. The number of FIPs to be added can be, for example, a function of the degree of matching latitude and the desired degree of resistance to brute force attacks against the transient template. A system administrator or an automated expert system can select the maximum permissible number of missing true minutiae in the transient template, the number of false minutiae to be added to the transient template, or both.

FIG. 12 illustrates the dynamic balance between the number of false minutiae and the number of missing true minutiae. For example, if the IT system were allowed to tolerate up to three missing true minutiae, then 29 false minutiae may be introduced, giving maximum resistance to brute force attack consistent with an average match time of about 1 second, e.g., $1.58 \times 10^{10}$ years. With 8 missing true minutiae, only 7 false minutiae may be added to give an average extraction time of 1 second. However, the resistance to brute force attack becomes essentially nil by comparison.

Because pattern matching is fundamental to the operation of any biometric system, it can be considered to be a primary factor when evaluating a specific biometric product. Thus, an acceptable biometric authentication system is accurate, relatively simple to deploy, and having a selectable tolerance adaptable to a variety of pragmatic factors.

The flexibility provided by features of this invention can be particularly advantageous in biometric implementations, where an adjustable matching error tolerance can be an important factor in tailoring authentication system performance to IT system needs. If this tolerance is too broad, the biometric fails to be a valid authentication mechanism, as reflected in a high false acceptance rate. If this tolerance level too narrow, the authorized users may have trouble being authenticated, increasing the false rejection rate. One advantage of a system implemented using embodiments of the present invention is the flexibility with which the tolerance level can be maintained. Indeed, in one embodiment of the present invention, the tolerance level can adapt dynamically to environmental factors, changing system parameters, and ad hoc policy decisions to meet emerging security threats.

A desirable biometric is one that is essentially non-invasive. An ideal biometric is a non-invasive biometric with continuous authentication. In other words, the user does not need to take any additional action to be authenticated which is effected by using continuous, live scans. The continuous authentication can prevent another from masquerading as an authenticated claimant by terminating access as soon as the intruder is detected, i.e., when the biometric data presented by the live scan does not acceptably compare with the biometric template of the purported claimant. A distinct advantage of biometric embodiments of the present invention is that it can be readily implemented to provide continuous, non-invasive biometric authentication. Another distinct advantage of biometric embodiments of the present invention is that existing authentication systems, particularly biometric-based authentication systems and single-point sign-on systems, can employ certain embodiments of the present invention to provide a relatively secure and convenient form authentication that can greatly enhance the pre-existing level of system security.

Where fingerprints are used as the imaged structure, the sensor can include, for example, optical and capacitive sensors, whether the sensors are based on a stand-alone entry point, a scanner co-located with a workstation or a laptop computer, or even a computer mouse having a sensor embedded therein, thereby providing continuous or near-continuous live scan biometric data of the user.

The biometrically-based implementations of the present inventions have been found to be particularly advantageous when used as part of the Single Point Security system and/or BioWare Systems manufactured and provided by Unisys Corporation, Blue Bell, Pa. In this environment, the preferred embodiments of the present invention can be used to support and enable enterprise-wide, policy-driven administration of a security system across multiple security domains and across network operating systems, legacy systems, and client/server systems from a variety of vendors. Additionally, it is possible to control access to specified files, allowing only authenticated end users access to files and directories. Furthermore, embodiments of the present invention permits user-specific end-user activity audits. These advantages may be obtained even by implementing certain embodiments of the invention herein in existing security systems.

Another advantage to certain embodiments of the present invention is that they can be used alone or in combination with other security features. For example, where a fingerprint-based biometric is used on a credential card, the card can be made of many long-lasting and resilient materials such as polyvinyl chloride or polyester and can incorporate other security features such as holograms, ghosting, logos, dyes, overlays, UV/IR-responsive materials, covert patterns, and the like. The authentication data (e.g., the transient template) can be stored, for example, on a magnetic stripe, in a two-dimensional bar code, in an integrated circuit device as part of a "smart card," and with other emerging technologies.

In view of the above, embodiments of the present invention can be used to increase fraud-resistance in identification-based applications, including without limitation: social services, driver licensing, voter registration, inmate verification, firearm licensing, patient verification, banking, baggage and passenger matching for public transportation systems, and electronic passenger ticketing. All of the above advantages can be gained without the risks posed by the use of the actual immutable characteristic (e.g., actual fingerprint minutiae), so that a compromised user credential can be replaced quickly and without eliminating the particular immutable characteristic from the pool of user-specific identifiers.

Furthermore, certain other embodiments of the present invention may be used in a vast array of authentication implementations, for example, the self-authentication of value documents, maps, and audio or visual recordings.

While various embodiments of the invention have been described in detail, it will be appreciate by those skilled in the art that various modifications and alternatives to those details could be developed in light of the overall teachings of the disclosure. Accordingly, the particular arrangements disclosed are meant to be illustrative only and not limiting to the scope of the invention which is to be given the full breadth of the following claims, and any and all embodiments thereof.

What is claimed is:

1. An apparatus for encoding an original image for authentication, the apparatus comprising:
   a. an image receiver for receiving the original image, the image having true image points associated therewith;
   b. a false image point generator providing false image points;
   c. a key generator that generates a substantially random encoding key from the false image points using a preselected key generation technique;
   d. an encryptor that encrypts a plaintext using the generated encoding key to produce a ciphertext; and
   e. a transient template generator operably connected with the image receiver, the encryptor, and the false image point generator, the template generator providing a transient template by selectively combining the false image points, the ciphertext, and a preselected portion of the true image points.

2. The apparatus of claim 1 wherein the false image point generator constrains false image points such that
   a. the false image points are plausible impostors of the true image points; and
   b. the false image points are not coincident with true image points.

3. The apparatus of claim 1 wherein the image receiver provides a master template from the original true image points.

4. The apparatus of claim 1, wherein the preselected key generation technique includes a hashing technique.

5. The apparatus of claim 1, wherein the image receiver provides a master template from the original true image points and further comprising a master template database operably connected to the image receiver, the master template database receiving the master template from the image receiver.

6. A method for providing authenticating indicia in an original image having information points associated therewith, the method comprising the steps of:
   a. selecting true image points from the plurality of information points, the true image points being representative of the original image;
   b. providing false image points;
   c. generating a substantially random encoding key from the false image points using a preselected key generation technique;
   d. encrypting a plaintext using the generated encoding key to produce a ciphertext; and
   e. forming a transient template by selectively combining the false image points, the ciphertext, and a preselected portion of the true image points.

7. The method of claim 6 wherein the false image points are plausible impostors of the true image points.

8. The method of claim 6 wherein the preselected key generating technique includes a hash technique, and wherein said encrypting step is performed using one of a symmetric encryption technique, and an asymmetric encryption technique with a private key having an arbitrary value.

9. The method of claim 6 further comprising the steps of:
   a. creating a master template from the true information points, the master template being a unique representation of the original image; and
   b. storing the master template.

10. The method of claim 6 wherein the image is a biometric image.

11. The method of claim 6 wherein the biometric image is a fingerprint, the true information points are fingerprint minutiae, the preselected key generating technique includes a hashing technique, and said encrypting step is performed using one of a symmetric encryption technique, and an asymmetric encryption technique with a private key of arbitrary value.

12. A method for producing a self-authentication code for an n-dimensional image having true image points, the method comprising the steps of:
   a. receiving the true image points;
   b. synthesizing false image points;
   c. generating a substantially random encoding key from the false image points using a preselected key generation technique;

d. encrypting a plaintext using the generated encoding key to produce a ciphertext; and e. forming a transient template by selectively combining the false image points, the ciphertext, and a preselected portion of the true image points.

13. An article of manufacture comprising a computer program embodied on a computer-readable medium for providing a method for self-authentication, the method comprising the steps of:

a. receiving true image points;

b. synthesizing false image points;

c. generating a substantially random encoding key from the false image points using a preselected key generation technique;

d. encrypting a plaintext using the generated encoding key to produce a ciphertext; and e. forming a transient template by selectively combining the false image points, the ciphertext, and a preselected portion of the true image points.

14. The product of claim 13, wherein the method embodied on the computer-readable medium further comprises:

a. creating a unique master template from the true data points of the original image; and b. storing the master template.

15. The apparatus recited in claim 1, wherein in addition to the false image points, the ciphertext, and the preselected portion of the true image points, the transient template generator also combines the plaintext on the transient template.

16. The method recited in claim 6, wherein said forming step comprises selectively combining the false image points, a preselected portion of the true image points, the plaintext, and the ciphertext.

17. The method recited in claim 12, wherein said forming step comprises selectively combining the false image points, a preselected portion of the true image points, the plaintext, and the ciphertext.

18. The article of manufacturing recited in claim 13, wherein said forming step comprises selectively combining the false image points, a preselected portion of the true image points, the plaintext, and the ciphertext.

* * * * *